US012614407B2

(12) United States Patent
Oh et al.

(10) Patent No.: US 12,614,407 B2
(45) Date of Patent: Apr. 28, 2026

(54) GENERATING SEGMENTATION MASKS FOR OBJECTS IN DIGITAL VIDEOS USING POSE TRACKING DATA

(71) Applicant: Adobe Inc., San Jose, CA (US)

(72) Inventors: Seoung Wug Oh, San Jose, CA (US); Miran Heo, Seoul (KR); Joon-Young Lee, Miliptas, CA (US)

(73) Assignee: Adobe Inc., San Jose, CA (US)

( * ) Notice: Subject to any disclaimer, the term of this patent is extended or adjusted under 35 U.S.C. 154(b) by 532 days.

(21) Appl. No.: 17/552,857

(22) Filed: Dec. 16, 2021

(65) Prior Publication Data

US 2023/0196817 A1 Jun. 22, 2023

(51) Int. Cl.
G06V 40/10 (2022.01)
G06T 7/10 (2017.01)
(Continued)

(52) U.S. Cl.
CPC .............. G06V 40/103 (2022.01); G06T 7/10 (2017.01); G06T 7/70 (2017.01); G06V 10/40 (2022.01);
(Continued)

(58) Field of Classification Search
CPC ...... G06V 40/103; G06V 10/40; G06V 10/25; G06V 10/26; G06V 10/62; G06V 10/806;
(Continued)

(56) References Cited

U.S. PATENT DOCUMENTS

| | | | | |
|---|---|---|---|---|
| 10,961,170 | B2 * | 3/2021 | Hermans | ................ B01J 35/643 |
| 11,417,061 | B1 * | 8/2022 | Feng | ...................... G06T 17/20 |

(Continued)

FOREIGN PATENT DOCUMENTS

| | | | | |
|---|---|---|---|---|
| CN | 111179281 | A * | 5/2020 | .......... G06N 3/0454 |
| CN | 113177946 | A | 7/2021 | |

(Continued)

OTHER PUBLICATIONS

Examination Report as received in GB application 2214974.4 dated May 5, 2023.

(Continued)

*Primary Examiner* — Jennifer Mehmood
*Assistant Examiner* — Heath E. Wells
(74) *Attorney, Agent, or Firm* — Keller Preece PLLC

(57) ABSTRACT

The present disclosure relates to systems, methods, and non-transitory computer-readable media that generate joint-based segmentation masks for digital objects portrayed in digital videos. In particular, in one or more embodiments, the disclosed systems utilize a video masking model having a pose tracking neural network and a segmentation neural network to generate the joint-based segmentation masks. To illustrate, in some embodiments, the disclosed systems utilize the pose tracking neural network to identify a set of joints of the digital object across the frames of the digital video. The disclosed systems further utilize the segmentation neural network to generate joint-based segmentation masks for the video frames that portray the object using the identified joints. In some cases, the segmentation neural network includes a multi-layer perceptron mixer layer for mixing visual features propagated via convolutional layers.

20 Claims, 12 Drawing Sheets

(51) Int. Cl.
    *G06T 7/70*        (2017.01)
    *G06V 10/40*     (2022.01)
(52) U.S. Cl.
    CPC ............... *G06T 2207/20084* (2013.01); *G06T 2207/30196* (2013.01)
(58) Field of Classification Search
    CPC ........ G06V 20/46; G06V 10/82; G06V 20/49; G06T 7/10; G06T 7/70; G06T 2207/20084; G06T 2207/30196; G06T 2207/10016; G06T 7/194; G06T 7/11; G06N 3/08
    USPC ........................................................ 382/132
    See application file for complete search history.

(56)           References Cited

U.S. PATENT DOCUMENTS

| 12,014,472 | B1 * | 6/2024 | Mirhosseini | ............ | G06T 19/20 |
|---|---|---|---|---|---|
| 2011/0267344 | A1 * | 11/2011 | Germann | ............... | G06V 20/64 |
| | | | | | 382/154 |
| 2012/0142479 | A1 | 6/2012 | Serrarens | | |
| 2018/0232887 | A1 * | 8/2018 | Lin | ........................... | G06T 7/11 |
| 2020/0272812 | A1 * | 8/2020 | Wang | ......................... | G06T 7/11 |
| 2020/0327334 | A1 * | 10/2020 | Goren | ..................... | G06T 7/194 |
| 2020/0327465 | A1 * | 10/2020 | Baek | ....................... | G16H 50/20 |
| 2020/0349722 | A1 * | 11/2020 | Schmid | .................... | G06T 7/269 |
| 2021/0201052 | A1 * | 7/2021 | Ranga | ...................... | G06N 3/08 |
| 2021/0216759 | A1 * | 7/2021 | Asayama | ............. | G06V 40/103 |
| 2022/0148453 | A1 * | 5/2022 | Lin | ........................... | G06T 7/73 |
| 2022/0156459 | A1 * | 5/2022 | Zhang | .................. | G06V 10/776 |
| 2022/0375211 | A1 * | 11/2022 | Tolstikhin | ............ | G06V 10/454 |
| 2023/0154091 | A1 * | 5/2023 | Cho | ......................... | G06T 13/40 |
| | | | | | 345/419 |
| 2023/0336758 | A1 * | 10/2023 | Ikonin | .................... | H04N 19/59 |
| 2024/0303859 | A1 * | 9/2024 | Nakamura | .............. | G06T 7/251 |
| 2024/0350010 | A1 * | 10/2024 | Krueger | ............... | A61B 5/0077 |

FOREIGN PATENT DOCUMENTS

| CN | 113610102 | A | 11/2021 |
|---|---|---|---|
| WO | 2021/186223 | A1 | 9/2021 |

OTHER PUBLICATIONS

Mykhaylo Andriluka, Umar Iqbal, Eldar Insafutdinov, Leonid Pishchulin, Anton Milan, Juergen Gall, and Bernt Schiele. Posetrack: A benchmark for human pose estimation and tracking. In CVPR, 2018.

Ali Athar, Sabarinath Mahadevan, Aljosa Osep, Laura Leal-Taixe, and Bastianan Leibe. Stem-seg: Spatio-temporal embeddings for instance segmentation in videos. In ECCV, 2020.

Jimmy Lei Ba, Jamie Ryan Kiros, and Geoffrey E Hinton. Layer normalization. arXiv preprint arXiv:1607.06450, 2016.

Dzmitry Bahdanau, Kyunghyun Cho, and Yoshua Bengio. Neural machine translation by jointly learning to align and translate. In ICLR, 2015.

Gedas Bertasius and Lorenzo Torresani. Classifying, segmenting, and tracking object instances in video with mask propagation. In CVPR, 2020.

Gedas Bertasius, Heng Wang, and Lorenzo Torresani. Is space-time attention all you need for video understanding? arXiv preprint arXiv:2102.05095, 2021.

Daniel Bolya, Chong Zhou, Fanyi Xiao, and Yong Jae Lee. Yolact: Real-time instance segmentation. In ICCV, 2019.

Zhaowei Cai and Nuno Vasconcelos. Cascade r-cnn: Delving into high quality object detection. In CVPR, 2018.

Jiale Cao, Rao Muhammad Anwer, Hisham Cholakkal, Fahad Shahbaz Khan, Yanwei Pang, and Ling Shao. Sipmask: Spatial information preservation for fast image and video instance segmentation. In ECCV, 2020.

Nicolas Carion, Francisco Massa, Gabriel Synnaeve, Nicolas Usunier, Alexander Kirillov, and Sergey Zagoruyko. End-to-end object detection with transformers. In ECCV, 2020.

Liang-Cheih Chen, George Papandreou, Iasonas Kokkinos, Kevin Murphy, and Alan L Yuille. Deeplab: Semantic image segmentation with deep convolutional nets, atrous convolution, and fully connected crfs. In IEEE TPAMI, 2017.

Liang-Chieh Chen, Yukun Zhu, George Papandreou, Florian Schroff, and Hartwig Adam. Encoder-decoder with atrous separable convolution for semantic image segmentation. In ECCV, 2018.

Bowen Cheng, Ross Girshick, Piotr Dollar, Alexander C Berg, and Alexander Kirillov. Boundary iou: Improving object-centric image segmentation evaluation. In CVPR, 2021.

Pierre Foret, Ariel Kleiner, Hossein Mobahi, and Behnam Neyshabur. Sharpness-aware minimization for efficiently improving generalization. ICLR, 2020.

Rohit Girdhar, Georgia Gkioxari, Lorenzo Torresani, Manohar Paluri, and Du Tran. Detect-and-track: Efficient pose estimation in videos. In CVPR, 2018.

Kaiming He, Georgia Gkioxari, Piotr Dollar, and Ross Girshick. Mask r-cnn. In ICCV, 2017.

Kaiming He, Xiangyu Zhang, Shaoqing Ren, and Jian Sun. Deep residual learning for image recognition. In CVPR, 2016.

Dan Hendrycks and Kevin Gimpel. Gaussian error linear units (gelus).arXiv preprint arXiv:1606.08415, 2016.

Sukjun Hwang, Miran Heo, Seoung Wug Oh, and Seon Joo Kim. Video instance segmentation using inter-frame communication transformers.arXiv preprint arXiv:2106.03299, 2021.

Umar Iqbal, Anton Milan, and Juergen Gall. Posetrack: Joint multi-person pose estimation and tracking. InCVPR, 2017.

Sheng Jin, Wentao Liu, Wanli Ouyang, and Chen Qian. Multi-person articulated tracking with spatial and temporal embeddings. In CVPR, 2019.

Will Kay, Joao Carreira, Karen Simonyan, Brian Zhang, Chloe Hillier, Sudheendra Vijayanarasimhan, Fabio Viola, Tim Green, Trevor Back, Paul Natsev, et al. The kinetics human action video dataset.arXiv preprint arXiv:1705.06950, 2017.

Harold W Kuhn. The hungarian method for the assignment problem. InNaval research logistics quarterly, 1955.

Tsung-Yi Lin, Michael Maire, Serge Belongie, James Hays, Pietro Perona, Deva Ramanan, Piotr Dollar, and C. Lawrence Zitnick. Microsoft coco: Common objects in context. In ECCV, 2014.

Dongfang Liu, Yiming Cui, Wenbo Tan, and Yingjie Chen. Sg-net: Spatial granularity network for one-stage video instance segmentation. InCVPR, 2021.

Ilya Loshchilov and Frank Hutter. Decoupled weight decay regularization. InICLR, 2019.

David G Lowe. Distinctive image features from scale-invariant keypoints. 2004.

Fausto Milletari, Nassir Navab, and Seyed-Ahmad Ahmadi. V-net: Fully convolutional neural networks for volumetric medical image segmentation. In3DV, 2016.

Seoung Wug Oh, Joon-Young Lee, Ning Xu, and Seon Joo Kim. Video object segmentation using space-time memory networks. InICCV, 2019.

Yaadhav Raaj, Haroon Idrees, Gines Hidalgo, and Yaser Sheikh. Efficient online multi-person 2d pose tracking with recurrent spatio-temporal affinity fields. InCVPR, 2019.

Michael Snower, Asim Kadav, Farley Lai, and Hans Peter Graf. 15 keypoints is all you need. InCVPR, 2020.

Zhi Tian, Chunhua Shen, Hao Chen, and Tong He. Fcos: Fully convolutional one-stage object detection. In ICCV,2019.

Ilya Tolstikhin, Neil Houlsby, Alexander Kolesnikov, Lucas Beyer, Xiaohua Zhai, Thomas Unterthiner, Jessica Yung, Daniel Keysers, Jakob Uszkoreit, Mario Lucic, et al. Mlp-mixer: An all-mlp architecture for vision.arXiv preprint arXiv:2105.01601, 2021.

Ashish Vaswani, Noam Shazeer, Niki Parmar, Jakob Uszkoreit, Llion Jones, Aidan N Gomez, Lukasz Kaiser, and Illia Polosukhin. Attention is all you need. InNeurIPS, 2017.

Paul Voigtlaender, Michael Krause, Aljosa Osep, Jonathon Luiten, Berin Balachandar Gnana Sekar, Andreas Geiger, and Bastian Leibe. Mots: Multi-object tracking and segmentation. In CVPR, 2019.

(56)        References Cited

OTHER PUBLICATIONS

Huiyu Wang, Yukun Zhu, Bradley Green, Hartwig Adam, 1026 Alan Yuille, and Liang-Chieh Chen. Axial-deeplab: Stand-alone axial-attention for panoptic segmentation. In ECCV, 1028 2020.

Manchen Wang, Joseph Tighe, and Davide Modolo. Combining detection and tracking for human pose estimation in videos. In CVPR, pp. 11088-11096, 2020.

Xiaolong Wang, Ross Girshick, Abhinav Gupta, and Kaiming He. Non-local neural networks. In CVPR, 2018.

Yuqing Wang, Zhaoliang Xu, Xinlong Wang, Chunhua Shen, Baoshan Cheng, Hao Shen, and Huaxia Xia. End-to-end video instance segmentation with transformers. In CVPR, 1037 2020.

Jialian Wu, Jiale Cao, Liangchen Song, Yu Wang, Ming Yang, and Junsong Yuan. Track to detect and segment: An online multi-object tracker. arXiv preprint arXiv:2103.08808, 2021.

Bin Xiao, Haiping Wu, and Yichen Wei. Simple baselines for human pose estimation and tracking. In ECCV, 2018.

Yuliang Xiu, Jiefeng Li, Haoyu Wang, Yinghong Fang, and Cewu Lu. Pose flow: Efficient online pose tracking. arXiv preprint arXiv:1802. 00977, 2018.

Zhenbo Xu, Wei Zhang, Xiao Tan, Wei Yang, Huan Huang, Shilei Wen, Errui Ding, and Liusheng Huang. Segment as points for efficient online multi-object tracking and segmentation. In ECCV, 2020.

Linjie Yang, Yuchen Fan, and Ning Xu. Video instance segmentation. In ICCV, 2019.

Shusheng Yang, Yuxin Fang, Xinggang Wang, Yu Li, Chen Fang, Ying Shan, Bin Feng, and Wenyu Liu. Crossover learning for fast online video instance segmentation. arXiv preprint arXiv:2104. 05970, 2021.

Fisher Yu, Dequan Wang, Evan Shelhamer, and Trevor Darrell. Deep layer aggregation. In CVPR, 2018.

Xingyi Zhou, Vladlen Koltun, and Philipp Krahenbuhl. Tracking objects as points. In ECCV, 2020.

Xingyi Zhou, Dequan Wang, and Philipp Krahenbuhl. Objects as points. arXiv preprint arXiv:1904.07850, 2019.

Rempe et al., in Contact and Human Dynamics from Monocular Video, ECCV 2020 available at https://arxiv.org/abs/2007.11678.

Examination Report as received in GB application 2214974.4 dated Aug. 7, 2024.

Examination Report as received in GB application 2214974.4 dated Nov. 4, 2025.

Office Action as received in Chinese Application 2022-11165862.2 dated Nov. 26, 2025.

* cited by examiner

| videos | frames | instances | action classes | resolution |
|---|---|---|---|---|
| 500 | 19,154 | 720 | 79 | 720×1280 |

| Method | Training dataset | | Prediction | | FPS | Temporal Mask AP | | | | Temporal Boundary AP | | |
|---|---|---|---|---|---|---|---|---|---|---|---|---|
| | COCO | YTVIS | Mask | Keypoint | | AP | AP$_{85}$ | AP$_{90}$ | AP$_{95}$ | AP | AP$_{50}$ | AP$_{75}$ |
| MaskTrack R-CNN | ✓ | | ✓ | | 25.30 | 71.4 | 71.1 | 34.9 | 1.6 | 23.6 | 76.3 | 3.1 |
| MaskTrack R-CNN | ✓ | ✓ | ✓ | | 27.33 | 80.3 | 85.0 | 54.7 | 0.5 | 30.1 | 86.9 | 6.8 |
| SipMask | ✓ | | ✓ | | 37.06 | 79.3 | 79.8 | 56.6 | 10.6 | 42.1 | 87.6 | 34.5 |
| SipMask | ✓ | | ✓ | | 38.65 | 81.4 | 83.7 | 64.2 | 10.8 | 40.9 | 89.8 | 27.2 |
| Ours | ✓ | | ✓ | ✓ | 33.59 | 84.2 | 88.0 | 76.3 | 22.3 | 45.9 | 91.5 | 42.8 |

*Fig. 7*

| Settings | | Temporal Mask AP | | | Temporal Boundary AP | | |
|---|---|---|---|---|---|---|---|
| Keypoint | Mixer | AP | AP$_{50}$ | AP$_{75}$ | AP | AP$_{50}$ | AP$_{75}$ |
| | | 77.6 | 95.1 | 87.1 | 37.5 | 81.5 | 30.5 |
| ✓ | | 83.3 | 95.3 | 91.8 | 43.7 | 89.1 | 37.6 |
| ✓ | ✓ | 84.2 | 96.0 | 92.7 | 45.7 | 91.5 | 42.8 |

Determining Joint Coordinates For A Digital Object Of A Digital Video *1002*

Generating A Joint Heat Map For The Digital Object Using The Joint Coordinates *1004*

Generating A Joint-Based Segmentation Mask For The Digital Object Using The Joint Heat Map *1006*

GENERATING SEGMENTATION MASKS FOR OBJECTS IN DIGITAL VIDEOS USING POSE TRACKING DATA

BACKGROUND

Recent years have seen significant advancement in hardware and software platforms for digital video editing. For example, many conventional systems implement various techniques for adding text, lighting, background modifications, animations, or other digital effects throughout a digital video. To illustrate, some conventional systems create one or more segmentation masks for an object (e.g., a person) portrayed in a digital video. Such systems utilize the segmentation mask(s) to better integrate the digital effects into the digital video while the object is present.

Despite these advances, however, conventional video segmentation systems suffer from several technological shortcomings that result in inflexible, inaccurate, and inefficient operation. For instance, many conventional systems rigidly perform deep learning-based segmentation of an object of a digital video using an initial mask or scribble input. While some conventional systems utilize video instance segmentation techniques to perform segmentation without user-provided guidance, such systems employing these methods still fail to flexibly consider certain sets of data that can inform segmentation.

In addition to the flexibility problems described above, conventional video segmentation systems often fail to generate accurate segmentation masks. To illustrate, many of the video instance segmentation methods employed by conventional systems are not optimized for video editing applications. Further, these methods are often evaluated using an average precision metric, which prioritizes detection and tracking over segmentation quality. Accordingly, conventional systems employing these methods typically provide segmentation masks that are of poor quality for use in video editing applications. This problem is exacerbated when high-quality masks with fine granularity are required, such as when editing digital videos portraying people. Additionally, many conventional systems fail to accurately detect objects within a digital video, often leading to false positives, leading to further segmentation inaccuracies.

Further, conventional video segmentation systems suffer from inefficiencies. Indeed, with many conventional systems, accuracy and efficiency are inversely proportional. Accordingly, those systems that do manage to generate segmentation masks of sufficient accuracy do so slowly, consuming a significant number of computing resources (e.g., processing power and memory).

These, along with additional problems and issues, exist with regard to conventional video segmentation systems.

SUMMARY

One or more embodiments described herein provide benefits and/or solve one or more of the foregoing problems in the art with systems, methods, and non-transitory computer-readable media that flexibly incorporate pose information for objects portrayed in digital videos for accurate mask segmentation. In particular, in one or more embodiments, a system implements a pipeline that globally tracks pose and locally segments fined-grained masks for an object (e.g., a person) in a digital video. To illustrate, in some embodiments, the system employs a tracking model to globally track poses of the object by viewing the whole scene. The system further utilizes a local segmentation model to leverage the pose information as a powerful query to carry out segmentation. In some cases, the system incorporates a light-weight multi-layer perceptron mixer layer within the segmentation model to propagate the query pose throughout the region of interest. In this manner, the system flexibly incorporates pose information for high-quality segmentation via incorporation of a light-weight, efficient segmentation model.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates a table reflecting additional experimental results with regard to the effectiveness of the joint-based segmentation system in accordance with one or more embodiments;

FIG. 8 illustrates a table reflecting further experimental results with regard to the effectiveness of the joint-based segmentation system in accordance with one or more embodiments;

DETAILED DESCRIPTION

Figure 1:
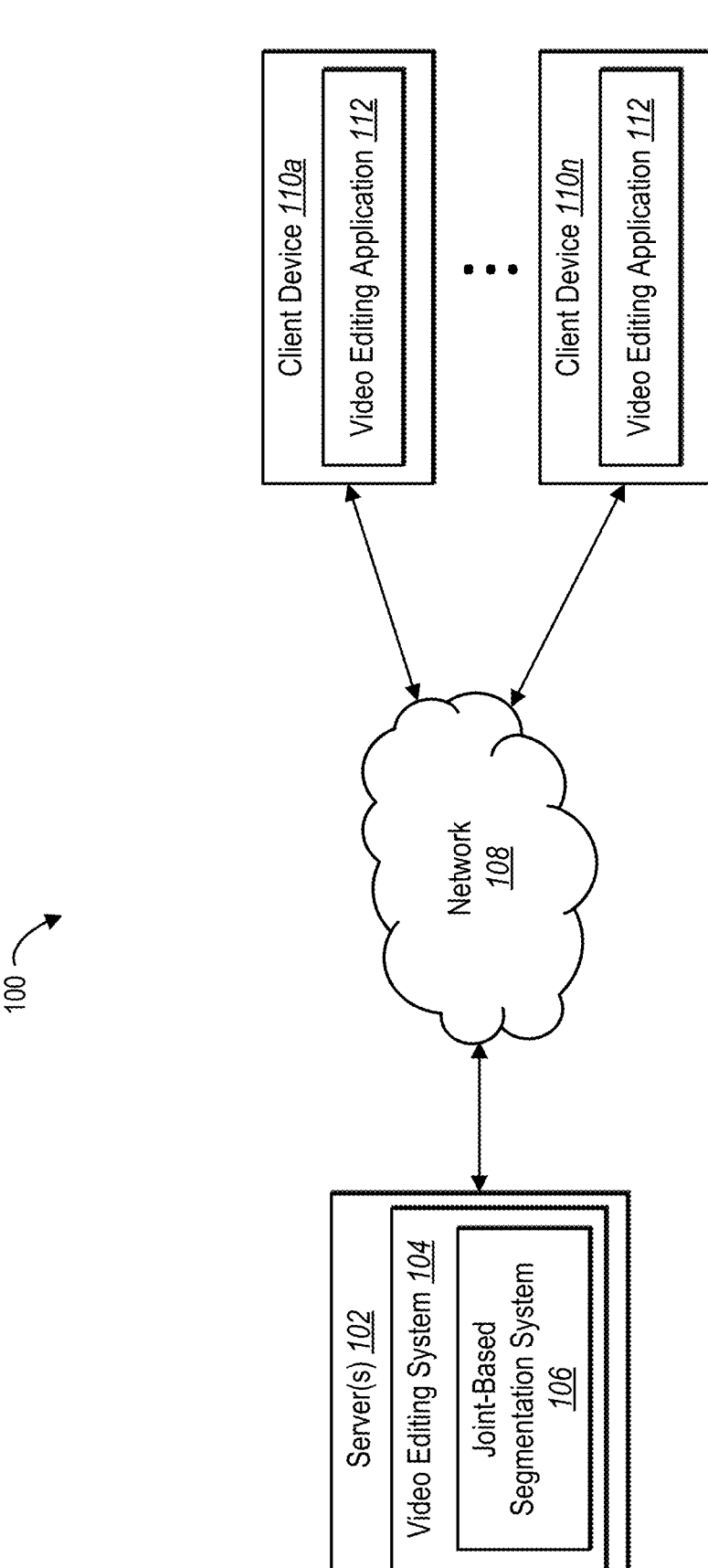
FIG. 1 illustrates an example environment in which a joint-based segmentation system operates in accordance with one or more embodiments.

One or more embodiments described herein include a joint-based segmentation system that employs a flexible pipeline model architecture for jointly tracking pose and segmenting masks for objects in digital videos. For example, in some implementations, the joint-based segmentation system globally tracks the pose of an object—such as a human—throughout a digital video. The joint-based segmentation system obtains skeleton information via the pose tracking, such as by identifying the locations of various joints of the object across the frames of the digital video. In some embodiments, the joint-based segmentation system utilizes this skeleton information as a query for local segmentation of the object. In some cases, the joint-based segmentation system adopts a multi-layer perceptron mixer layer to aggregate local features as part of the segmentation process. In some embodiments, the joint-based segmentation system employs the pipeline model architecture to perform instance segmentation, jointly tracking the pose and segmenting masks for each instance of the object within the digital video.

To provide an illustration, in one or more embodiments, the joint-based segmentation system determines a set of joint coordinates corresponding to a digital object portrayed in a frame of a digital video. Using the set of joint coordinates, the joint-based segmentation system generates a joint heat map corresponding to the digital object portrayed in the frame of the digital video. The joint-based segmentation system further generates a joint-based segmentation mask corresponding to the digital object portrayed in the frame of the digital video using the joint heat map.

As just mentioned in one or more embodiments, the joint-based segmentation system generates a joint-based segmentation mask for a digital object (e.g., a person) portrayed in a frame of a digital video based on joints associated with the digital object. In one or more embodiments, the joint-based segmentation system includes a pose tracking neural network and a segmentation neural network.

For example, in one or more embodiments, the joint-based segmentation system utilizes the pose tracking neural network to determine a set of joints of the digital object as portrayed in the frame of the digital video. In particular, the joint-based segmentation system utilizes the pose tracking neural network to identify a set of joint coordinates corresponding to positions of the joints in the frame of the digital video. In some embodiments, the pose tracking neural network determines the set of joint coordinates based on the frame of the digital video and a preceding frame of the digital video. Further, in some cases, the pose tracking neural network includes a global pose tracking neural network that globally analyzes the frame (and the preceding frame) to identify the set of joint coordinates.

Additionally, as mentioned above, in some implementations, the joint-based segmentation system generates a joint heat map utilizing the set of joints determined for the digital object from the frame of the digital video. For example, in some embodiments, the joint-based segmentation system generates the joint heat map as a single channel map that represents the locations of the joints within the frame of the digital video.

In some embodiments, the joint-based segmentation system utilizes the segmentation neural network to generate a joint-based segmentation mask corresponding to the digital object portrayed in the frame of the digital video using the joint heat map. In some cases, the segmentation neural network includes a plurality of convolutional layers and a multi-layer perceptron mixer layer for mixing visual features of the digital object.

In one or more embodiments, the segmentation neural network includes a local segmentation neural network that locally analyzes the frame of the digital video with respect to the digital object to generate the joint-based segmentation mask. To illustrate, in some cases, the joint-based segmentation system utilizes the pose tracking neural network to generate a bounding box associated with the digital object for the frame of the digital video. Using the bounding box, the joint-based segmentation system crops the frame of the digital video around the digital object. Accordingly, the joint-based segmentation system utilizes the segmentation neural network to generate the joint-based segmentation mask by locally analyzing the cropped frame based on the joint heat map.

In some implementations, the joint-based segmentation system utilizes a joint-based segmentation mask corresponding to the digital object for each frame of the digital video in which the digital object is portrayed. In some cases, the joint-based segmentation utilizes the joint-based segmentation mask corresponding to a frame of the digital video to modify the frame. Accordingly, the join-based segmentation system modifies the digital video using joint-based segmentation masks.

In some instances, the joint-based segmentation system generates segmentation masks for each instance of a digital object (e.g., each person) portrayed in the digital video. Thus, in some cases, the joint-based segmentation system generates multiple joint-based segmentation masks for a given frame of the digital video—each joint-based segmentation mask corresponding to a different object instance.

The joint-based segmentation system provides several advantages over conventional systems. For instance, the joint-based segmentation system flexibly performs segmentation using relevant data that is not considered under conventional systems. In particular, by using pose information (e.g., the joint coordinates), the joint-based segmentation system flexibly leverages additional data that informs the segmentation process without relying on user input for guidance.

Further, the joint-based segmentation system operates more accurately than conventional systems. Indeed, fine-grained segmentation masks and articular information are complementary to one another. For instance, segmentation masks help layer separation while joint information supports local patch tracking. Accordingly, by using pose information in the segmentation process, the joint-based segmentation system generates segmentation masks that more accurately separate a digital object from its surroundings, particularly where the digital object includes a person portrayed by the digital video. Further, the joint-based segmentation system generates segmentation masks that are more practical for use in video editing applications.

Additionally, the joint-based segmentation system operates more efficiently when compared to conventional systems. For instance, by utilizing a segmentation neural network having a light-weight multi-layer perceptron mixer layer, the joint-based segmentation system efficiently generates segmentation masks of high quality by addressing the small receptive field issue of shallow neural networks. Thus, the joint-based segmentation system reduces the amount of computing resources required to generate accurate segmentation masks. This is particularly true when compared to conventional techniques that stack CNN blocks or use extra modules to enlarge the receptive field.

As illustrated by the foregoing discussion, the present disclosure utilizes a variety of terms to describe features and benefits of the joint-based segmentation system. Additional detail is now provided regarding the meaning of these terms. For example, as used herein, the term "joint-based segmentation mask" refers to a segmentation mask generated from pose information. For instance, in some cases, a joint-based segmentation mask includes a segmentation mask that corresponds to a digital object and is generated using digital data related to one or more joints of the digital object. To illustrate, in one or more embodiments, a joint-based segmentation mask includes a segmentation mask based on joint coordinates representing the one or more joints of the digital object.

Additionally, as used herein, the term "joint point" refers to a point on an outline or skeleton of a digital object. For example, in some cases, a joint point includes a point of articulation (e.g., a joint) of a digital object, such as an elbow, a wrist, a knee, an ankle, a shoulder of a person. In some implementations, however, a joint point includes other points on an outline or skeleton of a digital object that are usable for segmentation, such as a crown (e.g., top) of the digital object or a center of the digital object. Much of the following discusses joint points in the context of human digital objects. It should be noted, however, that joint points correspond to non-human (e.g., animal) digital objects in some implementations.

Further, as used herein, the term "joint coordinate" refers to a coordinate corresponding to a joint point of a digital object. In particular, in some embodiments, a joint coordinate refers to a value representing a location of a joint point of a digital object within a frame of a digital video. For example, in some cases, a joint coordinate is part of a pair of joint coordinates that, together, represent the location of a joint point within a frame of a digital video.

As used herein, the term "joint heat map" refers to a map of values that indicate the location of one or more joint points of a digital object within a frame of a digital video. In particular, in some embodiments, a joint heat map includes a one-channel map having values that distinguish between the joint point(s) and the surrounding areas. For example, in some cases, a joint heat map includes a joint-agnostic heatmap with activations in the regions of the corresponding joint points.

Additionally, as used herein, the term "joint-based segmentation system" refers to a computer-implemented model for generating joint-based segmentation masks for digital objects portrayed in digital videos. In particular, in some embodiments, a joint-based segmentation system includes a computer-implemented model that generates, for a digital object portrayed in a digital video, a joint-based segmentation mask corresponding to a frame of the digital video that portrays the digital object. In some cases, a joint-based segmentation system includes a framework of computer-implemented models for generating the joint-based segmentation masks. For example, in some cases, a joint-based segmentation system includes a pose tracking neural network, a segmentation neural network, and/or other computer-implemented models or algorithms for generating joint-based segmentation masks.

As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Additionally, as used herein, the term "pose tracking neural network" refers to a computer-implemented neural network that identifies joint points associated with a digital object. In particular, in some cases, a pose tracking neural network refers to a computer-implemented neural network that determines a set of joint coordinates for a digital object portrayed in a frame of a digital video. For example, in some implementations, a pose tracking neural network determines a set of joint coordinates corresponding to the depiction of the digital object within the frame of the digital video by analyzing the frame and a preceding frame of the digital video. Relatedly, as used herein, the term "global pose tracking neural network" refers to a pose tracking neural network that identifies joint points associated with a digital object by globally analyzing the frame (and the preceding frame) of the digital video.

Further, as used herein, the term "segmentation neural network" refers to a computer-implemented neural network that generates a joint-based segmentation mask corresponding to a digital object portrayed in a digital video based on associated joint points of the digital object. In particular, in some embodiments, a segmentation neural network refers to a computer-implemented neural network that generates a joint-based segmentation mask for a digital object based on a corresponding set of joint coordinates that indicate the locations of the joint points of the digital object within a frame of a digital video. For example, in some implementations, a segmentation neural network generates a joint-based segmentation mask for a digital object using a joint heat map corresponding to a set of joint coordinates of the digital object for a frame of a digital video. Relatedly, as used herein, the term "local segmentation neural network" refers to a segmentation neural network that generates a joint-based segmentation mask for a digital object based by locally analyzing a portion of a frame of a digital video that includes the digital object.

As used herein, the term "multi-layer perceptron mixer layer" includes a neural network component that mixes visual features of a corresponding neural network input. In particular, in some embodiments, a multi-layer perceptron mixer layer refers to a neural network component that mixes visual features corresponding to a digital object portrayed in a frame of a digital video. To illustrate, in some embodiments, a multi-layer perceptron mixer layer includes a neural network component that mixes visual features across spatial locations and/or feature channels. In some cases, a multi-layer perceptron mixer layer includes a combination of neural network layers that, together, mix the visual features. Relatedly, as used herein, the term "mixer encoding" refers to an encoding representing mixed visual features. For example, in some cases, a mixer encoding includes to an encoding generated by an encoder of a neural network, where the encoder includes at least one multi-layer perceptron mixer layer.

As used herein, the term "tracking identifier" refers to a value representing a digital object within a digital video. For example, in some cases, a tracking identifier refers to a value (e.g., an alphanumeric value) that identifies a digital object within a frame of a digital video and further distinguishes the digital object from other digital objects portrayed in the same frame.

Additional detail regarding the joint-based segmentation system will now be provided with reference to the figures. For example, FIG. 1 illustrates a schematic diagram of an exemplary system 100 in which a joint-based segmentation system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the joint-based segmentation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 11). Moreover, the server(s) 102 and the client devices 110a-110n include one of a variety of computing devices (including one or more computing devices as discussed in greater detail with relation to FIG. 11).

As mentioned above, the system 100 includes the server(s) 102. In one or more embodiments, the server(s) 102 generates, stores, receives, and/or transmits data including digital videos, joint-based segmentation masks, and modified digital videos. For example, in some embodiments, the server(s) 102 receives a digital video from a client device (e.g., one of the client devices 110a-110n) and transmits a joint-based segmentation mask or modified digital video to the client device in response. In one or more embodiments, the server(s) 102 comprises a data server. In some implementations, the server(s) 102 comprises a communication server or a web-hosting server.

As shown in FIG. 1, the server(s) 102 includes video editing system 104. In one or more embodiments, the video editing system 104 provides functionality by which a user (e.g., a user of one of the client devices 110a-110n) generates, edits, manages, and/or stores digital videos. For example, in some instances, a user utilizes a client device to send a digital video to the video editing system 104 hosted on the server(s) 102 via the network 108. The video editing system 104 then provides many options that the user may use to edit the digital video, store the digital video, and subsequently search for, access, and view the digital video.

Additionally, the server(s) 102 includes the joint-based segmentation system 106. In particular, in one or more embodiments, the joint-based segmentation system 106 utilizes the server(s) 102 to generate joint-based segmentation masks for digital objects portrayed in digital videos. For example, in some embodiments, the joint-based segmentation system 106 utilizes the server(s) 102 to receive a digital video that portrays a digital object and generate one or more joint-based segmentation masks for the digital object.

To illustrate, in one or more embodiments, the joint-based segmentation system 106, via the server(s) 102, determines a set of joint coordinates corresponding to a digital object portrayed in a frame of a digital video and generates a joint-based segmentation mask corresponding to the digital object portrayed in the frame of the digital video based on the set of joint coordinates. In some cases, via the server(s) 102, the joint-based segmentation system 106 further modifies the digital video (e.g., modifies the frame of the digital video) utilizing the joint-based segmentation mask.

In one or more embodiments, the client devices 110a-110n include computing devices that are capable of displaying and/or modifying digital videos. For example, the client devices 110a-110n include one or more of smartphones, tablets, desktop computers, laptop computers, head-mounted-display devices, and/or other electronic devices. In some instances, the client devices 110a-110n include one or more applications (e.g., the video editing application 112) that allow for the display and/or modification of digital videos. For example, in one or more embodiments, the video editing application 112 includes a software application installed on the client devices 110a-110n. Additionally, or alternatively, the video editing application 112 includes a software application hosted on the server(s) 102 (and supported by the video editing system 104), which is accessible by the client devices 110a-110n through another application, such as a web browser.

In some implementations, the joint-based segmentation system 106 on the server(s) 102 supports the joint-based segmentation system 106 on the client devices 110a-110n. For instance, in some cases, the joint-based segmentation system 106 on the server(s) 102 learns parameters for the model(s) utilized to generate joint-based segmentation masks. The joint-based segmentation system 106 then, via the server(s) 102, provides the model(s) to the client devices 110a-110n. In other words, the client devices 110a-110n obtain (e.g., download) the model(s) with the learned parameters from the server(s) 102. Once downloaded, the client devices 110a-110n utilize the model(s) to generate joint-based segmentation masks independent from the server(s) 102.

In alternative implementations, the joint-based segmentation system 106 includes a web hosting application that allows the client devices 110a-110n to interact with content and services hosted on the server(s) 102. To illustrate, in one or more implementations, one of the client devices 110a-110n accesses a web page supported by the server(s) 102. The client device provides a digital video to the server(s) 102, and, in response, the joint-based segmentation system 106 on the server(s) 102 generates one or more joint-based segmentation masks for a digital object portrayed in the digital video. The server(s) 102 then provides the joint-based segmentation mask(s) to the client device and/or provides features for modifying the digital video using the joint-based segmentation mask(s).

Indeed, the joint-based segmentation system 106 is able to be implemented in whole, or in part, by the individual elements of the system 100. Indeed, although FIG. 1 illustrates the joint-based segmentation system 106 implemented with regard to the server(s) 102, different components of the joint-based segmentation system 106 can be implemented by a variety of devices within the system 100. For example, in one or more implementations, one or more (or all) components of the joint-based segmentation system 106 are implemented by a different computing device (e.g., one of the client devices 110a-110n) or a separate server from the server(s) 102 hosting the video editing system 104. Example components of the joint-based segmentation system 106 will be described below with regard to FIGS. 3 and 4.

Figure 2:
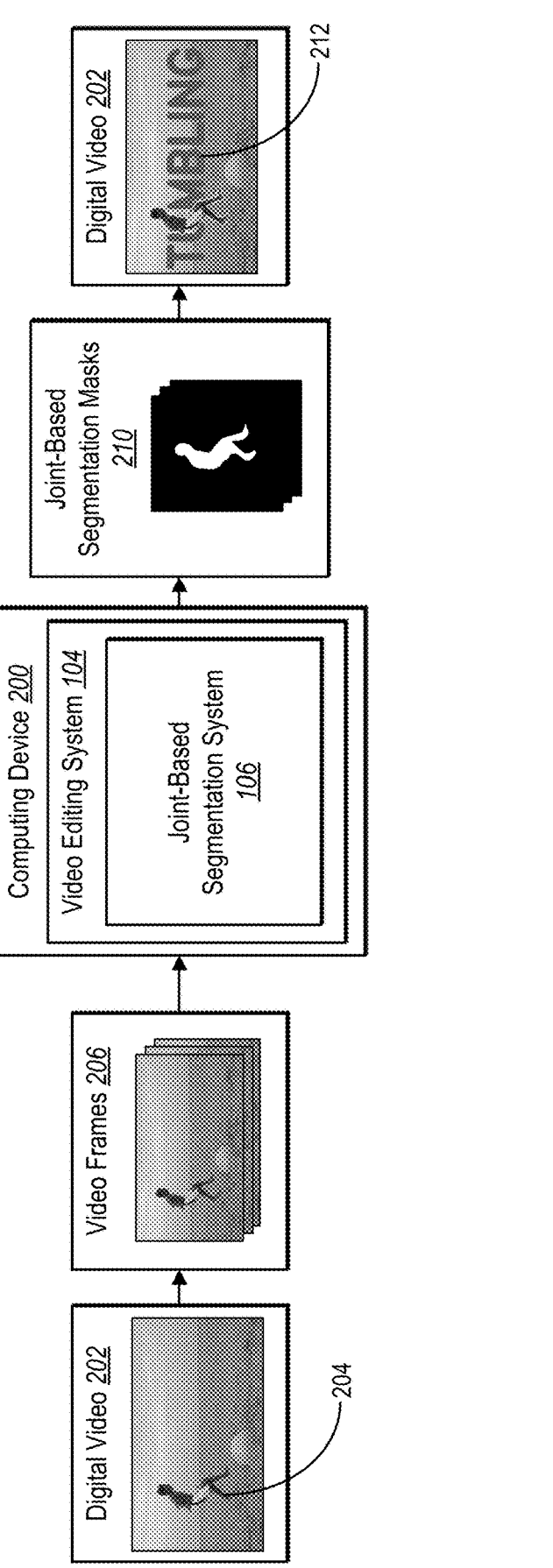
FIG. 2 illustrates an overview diagram of the joint-based segmentation system generating joint-based segmentation masks for a digital object portrayed in a digital video in accordance with one or more embodiments.

As mentioned above, in one or more embodiments, the joint-based segmentation system 106 generates joint-based segmentation masks corresponding to digital objects portrayed in digital videos. FIG. 2 illustrates an overview diagram of the joint-based segmentation system 106 generating joint-based segmentation masks for a digital object portrayed in a digital video in accordance with one or more embodiments.

Indeed, as shown in FIG. 2, the joint-based segmentation system 106 generates joint-based segmentation masks 210 corresponding to an object 204 portrayed in a digital video 202. In one or more embodiments, the joint-based segmentation system 106 obtains the digital video 202 by receiving the digital video 202 from a computing device (e.g., a client device or a third-party system). In some cases, the joint-based segmentation system 106 retrieves the digital video 202 from a database or external storage device. As discussed above, and as shown in FIG. 2, in some instances, the joint-based segmentation system 106 operates on a computing device 200 (e.g., the server(s) 102 or one of the client devices 110a-110n discussed above with reference to FIG. 1 or some other mobile computing device, such as smart phone or tablet). Accordingly, in some embodiments, the joint-based segmentation system 106 identifies the digital video 202 by accessing the digital video 202 from local storage, detecting that the computing device 200 has captured the digital video 202, or by determining that the computing device 200 has activated a camera to capture the digital video 202.

As further shown in FIG. 2, the joint-based segmentation system 106 extracts video frames 206 from the digital video 202. For example, in some implementations, the joint-based segmentation system 106 extracts, from the digital video 202, each video frame that portrays the object 204. In some cases, where multiple digital objects are portrayed in the digital video 202, the joint-based segmentation system 106 extracts each video frame that portrays at least one digital object. In some implementations, the joint-based segmentation system 106 extracts all video frames from the digital video 202.

Additionally, the joint-based segmentation system 106 jointly tracks pose and perform segmentation using the video frames 206. To illustrate, in some cases, the joint-based segmentation system 106 is composed of a pipeline architecture that includes a pose tracking neural network and a segmentation neural network. More detail regarding the joint-based segmentation system 106 and its architecture will be provided below with respect to FIGS. 3-4.

As further shown, based on the analysis of the video frames 206, the joint-based segmentation system 106 generates the joint-based segmentation masks 210. For example, in one or more embodiments, the joint-based segmentation system 106 generates a joint-based segmentation mask for each frame of the digital video 202 that portrays a digital object. In some cases, where a video frame portrays multiple digital objects, the joint-based segmentation system 106 generates multiple joint-based segmentation masks for that video frame—one for each portrayed digital object.

In one or more embodiments, the joint-based segmentation system 106 generates joint-based segmentation masks for a targeted class of digital object. Indeed, much of the following discusses generating joint-based segmentation masks for instances of humans portrayed in a digital video. It should be understood, however, that the joint-based segmentation system 106 generates joint-based segmentation masks for a variety of digital objects in many embodiments.

Additionally, as illustrated by FIG. 2, the joint-based segmentation system 106 utilizes the joint-based segmentation masks 210 to modify the digital video 202. For example, as shown, the joint-based segmentation system 106 modifies the digital video 202 to include text 212. Thus, in one or more embodiments, the joint-based segmentation system 106 utilizes the pose tracking to perform segmentation that facilitate modification of the digital video 202.

Figure 3:
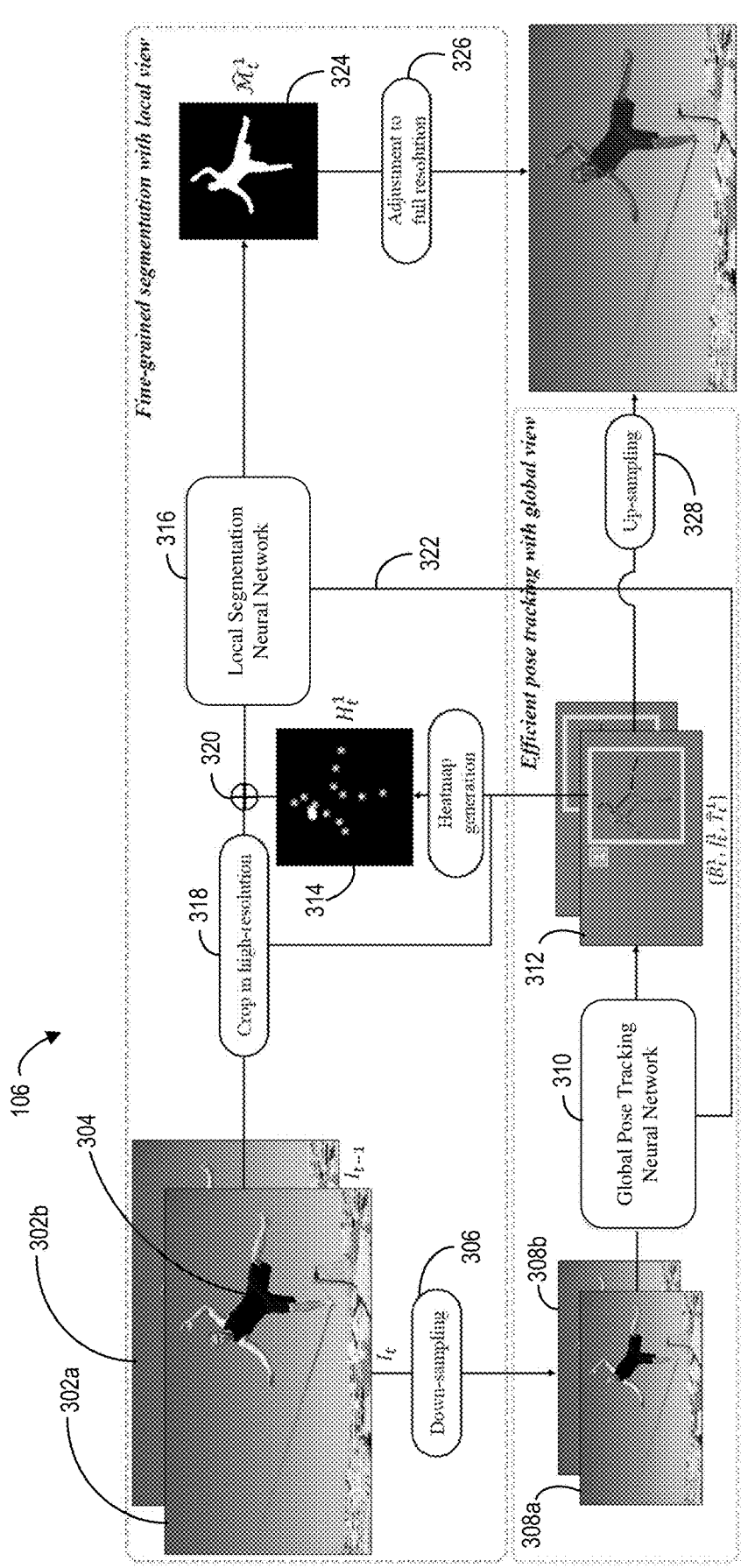
FIG. 3 illustrates a pipeline framework of the joint-based segmentation system generating joint-based segmentation masks in accordance with one or more embodiments.

FIG. 3 illustrates an example pipeline framework of a joint-based segmentation system 106 to generate joint-based segmentation masks in accordance with one or more embodiments. In particular, FIG. 3 illustrates utilizing the joint-based segmentation system 106 to jointly track pose and perform segmentation for a digital object portrayed in a digital video.

Indeed, as shown in FIG. 3, the joint-based segmentation system 106 extracts a pair of frames 302a-302b from a digital video. In one or more embodiments, the frame 302a (labeled I_t) includes a current frame of the digital video. In other words, the frame 302a includes the frame for which the joint-based segmentation system 106 generates a joint-based segmentation mask at time step t. In some embodiments, the frame 302b (labeled I_{t-1}) represents a preceding frame (e.g., an immediately preceding frame) of the digital video. As further shown in FIG. 3, the frames 302a-302b each portray a digital object 304 (e.g., a person).

As further shown in FIG. 3, the joint-based segmentation system 106 down samples the frames 302a-302b (as shown by the box 306) to create down-sampled frames 308a-308b. Further, the joint-based segmentation system 106 provides the down-sampled frames 308a-308b to a global pose tracking neural network 310. In one or more embodiments, the joint-based segmentation system 106 utilizes the down-sampled frames 308a-308b to incorporate large receptive field that covers the whole scene depicted in the frames 302a-302b while facilitating fast pose tracking inference.

As illustrated by FIG. 3, the joint-based segmentation system 106 utilizes the global pose tracking neural network 310 to generate the pose tracking output 312. In one or more embodiments, the joint-based segmentation system 106 utilizes, as the global pose tracking neural network 310, the pose estimation model and techniques described by Rempe et al., in *Contact and Human Dynamics from Monocular Video*, ECCV 2020 available at https://arxiv.org/abs/2007.11678, which is incorporated herein by reference in its entirety. In some embodiments, the global pose tracking neural network 310 includes the pose tracking neural network described by Xingyi Zhou et al., *Tracking Objects as Points*, https://arxiv.org/pdf/2004.01177.pdf, 2020, which is incorporated herein by reference. In some instances, the global pose tracking neural network 310 includes an additional pose estimation head described by Xingyi Zhou et al., *Objects as Points*, https://arxiv.org/pdf/1904.07850.pdf, 2019, which is incorporated herein by reference.

For example, in one or more embodiments, the joint-based segmentation system 106 utilizes the global pose tracking neural network 310 to generate the pose tracking output 312 as follows:

$$\left\{ \hat{B}_t^i, \hat{J}_t^i, \hat{T}_t^i \right\}_{i=1}^{N_t} = \mathcal{P}_{global}(I_t, I_{t-1}, C_{t-1}) \tag{1}$$

In equation 1, $C_{t-1}$ represents to an instance-agnostic centerness heatmap, which represent tracked objects corresponding to the frame 302b from time step t−1. Further, $$\hat{B}_t^i$$

represents a bounding box, $$\hat{J}_t^i$$

represents a set of k joint coordinates, and $$\hat{T}_t^i$$

represents a tracking identifier for the $i^{th}$ object. $N_t$ represents the number of instances detected in the current frame (e.g., instances of a targeted class of digital object). Thus, in one or more embodiments, the joint-based segmentation system 106 utilizes the global pose tracking neural network 310 to generate a bounding box, a set of joint coordinates, and a tracking identifier for the digital object 304 based on the frames 302a-302b. The joint-based segmentation system 106 similarly utilizes the global pose tracking neural network 310 to generate a bounding box, a set of joint coordinates, and a tracking identifier for other digital objects portrayed in the frame 302a.

As further shown in FIG. 3, the joint-based segmentation system 106 generates a joint heat map 314 (labeled $H_t$) for the digital object 304. In one or more embodiments, the joint-based segmentation system 106 re-adjusts the joint coordinates for the corresponding box area and uses the re-adjusted coordinates to generate the joint heat map 314. In some implementations, the joint-based segmentation system 106 centers a (e.g., two-dimensional) Gaussian distribution around each joint point associated with the joint coordinates to generate the joint heat map 314. Accordingly, in some cases, the joint-based segmentation system 106 utilizes the joint heat map 314 as a guiding signal to the input of the local segmentation neural network 316.

Indeed, as illustrated by FIG. 3, the joint-based segmentation system 106 provides the joint heat map 314 to the local segmentation neural network 316 along with a cropped frame corresponding to the frame 302a. In one or more embodiments, the joint-based segmentation system 106 generates a cropped frame to include the portion of the frame 302a that includes the digital object 304 (as shown by the box 318). For example, in at least one implementation, the joint-based segmentation system 106 generates the cropped frame from the frame 302a based on the bounding box $$\hat{B}_t$$

generated for the digital object 304 using the global pose tracking neural network 310. In some cases, the joint-based segmentation system 106 generates the cropped frame using an expanded area around the bounding box to relax the distance between the digital object 304 and the boundaries of the cropped frame. In some cases, the joint-based segmentation system 106 further up-samples the cropped region before providing it to the local segmentation neural network 316. By using a higher resolution for the input of the local segmentation neural network 316, the joint-based segmentation system 106 preserves fine details of the frame 302a.

In one or more embodiments, the joint-based segmentation system 106 combines the cropped frame and the joint heat map 314 and provides the resulting combination to the local segmentation neural network 316. For example, as shown in FIG. 3, the joint-based segmentation system 106 concatenates the cropped frame and joint heat map 314 (as shown by the operation 320) and provides the result of the concatenation to the local segmentation neural network 316. In one or more embodiments, the result of the concatenation includes a four-channel input (e.g., three channels from the RGB cropped frame and one channel from the joint heat map 314).

As shown by FIG. 3, the joint-based segmentation system 106 further provides intermediate features values to the local segmentation neural network 316. In particular, the joint-based segmentation system 106 provides intermediate feature values determined by the global pose tracking neural network 310 via a skip link 322.

As indicated by FIG. 3, the joint-based segmentation system 106 utilizes the local segmentation neural network 316 to generate a joint-based segmentation mask 324 corresponding to the digital object 304 (labeled $$\hat{M}_t$$

) based on the intermediate feature values, the joint heat map 314, and the cropped frame. Indeed, in one or more embodiments, the joint-based segmentation system 106 utilizes the local segmentation neural network 316 to generate the joint-based segmentation mask 324 as follows:

$$\{\hat{M}_t^i\}_{i=1}^{N_t} = S_{local}\left(\left\{\hat{B}_t^i(I_t) \oplus G_t^i\right\}_{i=1}^{N_t}\right) \tag{2}$$

In equation 2, G represents the joint heat map 314 corresponding to the digital object 304 for the frame 302a (i.e., the frame $I_t$) and $\oplus$ represents matrix concatenation. More detail regarding the architecture of the local segmentation neural network 316 will be provided below with reference to FIG. 4.

Additionally, as shown in FIG. 3, the joint-based segmentation system 106 adjusts the joint-based segmentation mask 324 to the full resolution of the frame 302a (as shown by box 326). Further, the joint-based segmentation system 106 up samples the pose tracking output 312 (as shown by box 328). For example, in some cases, the joint-based segmentation system 106 up samples the set of joint coordinates determined via the global pose tracking neural network 310. Accordingly, the joint-based segmentation system 106 tracks the pose of the digital object 304 within the full resolution of the digital video from corresponding to the frames 302a-302b.

In one or more embodiments, the joint-based segmentation system 106 similarly generates additional joint-based segmentation masks for the digital object 304 using additional frames of the digital video that portray the digital object 304. Likewise, the joint-based segmentation system 106 generates joint-based segmentation masks for additional digital objects portrayed in the digital video using the frames of the digital video. Thus, the joint-based segmentation system 106 is able to perform instance segmentation for separate instances depicted in a digital video.

By generating a joint-based segmentation mask for a digital object portrayed in a digital video, the joint-based segmentation system 106 operates more flexibly than conventional systems. Indeed, the joint-based segmentation system 106 flexibly incorporates pose information into the segmentation process. Specifically, the joint-based segmentation system 106 globally tracks pose information then locally segments and exploits the pose information as a strong query to perform the segmentation. Further, the joint-based segmentation system 106 operates more accurately. In particular, by utilizing pose information for segmentation, the joint-based segmentation system 106 performs segmentation based on additional, complementary information. Accordingly, the joint-based segmentation system 106 generates segmentation masks that more accurately separate a digital object from its surroundings.

Figure 4:
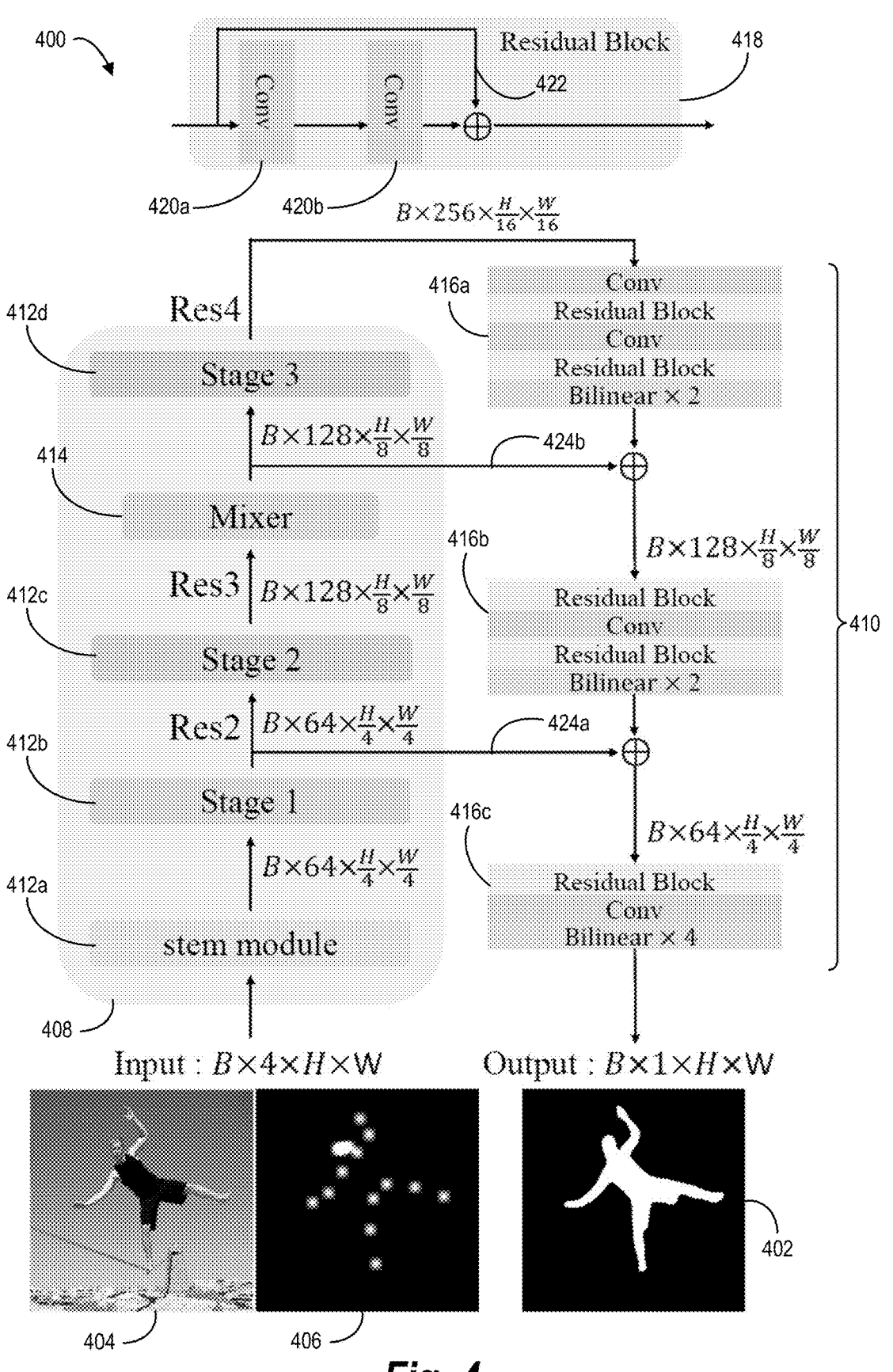
FIG. 4 illustrates a neural network architecture of a local segmentation neural network used to generate joint-based segmentation masks for digital objects in accordance with one or more embodiments.

FIG. 4 illustrates a neural network architecture of a local segmentation neural network 400 used to generate joint-based segmentation masks for digital objects in accordance with one or more embodiments. As shown in FIG. 4, and as previously discussed, the joint-based segmentation system 106 utilizes the local segmentation neural network 400 to generate a joint-based segmentation mask 402 corresponding to a digital object portrayed in a frame of a digital video based on a cropped frame 404 and a joint heat map 406 generated from the frame of the digital video.

As illustrated by FIG. 4, the local segmentation neural network 400 includes an encoder 408 and a decoder 410. The joint-based segmentation system 106 utilizes the encoder 408 of the local segmentation neural network 400 to generate mixer encodings based on the cropped frame 404 and the joint heat map 406. The joint-based segmentation system 106 further utilizes the decoder 410 to generate the joint-based segmentation mask 402 based on the mixer encodings.

As shown in FIG. 4, the encoder 408 includes a plurality of convolutional layers 412a-412d. In one or more embodiments, the joint-based segmentation system 106 utilizes, as the convolutional layers 412a-412d, various convolutional layers of a residual neural network. To illustrate, as indicated by FIG. 4, the encoder 408 includes the stem module, Res2, Res3, and Res4 convolutional layers from ResNet-18.

As further shown, the encoder 408 also includes a multi-layer perceptron mixer layer 414. Indeed, as shown, the encoder 408 utilizes the multi-layer perceptron mixer layer 414 after the convolutional layers 412a-412c have propagated localized visual features. Accordingly, the encoder 408 utilizes the multi-layer perceptron mixer layer 414 to leverage both the global association of sparsely annotated joint points and localization information of foreground objects. In particular, the joint-based segmentation system 106 utilizes the multi-layer perceptron mixer layer 414 to understand semantic information in cropped patches of high resolution. In one or more embodiments, the encoder 408 determines an output of the multi-layer perceptron mixer layer 414 as follows:

$$U_{*,i} = F_{*,i} + W_2 \sigma(W_1 LN(F)_{*,i}), \text{ for } i=1 \ldots c,$$

$$Y_{j,*} = U_{j,*} + W_4 \sigma(W_3 LN(U)_{j,*}), \text{ for } i=1 \ldots s \quad (3)$$

In equation 3, F represents features determined via the convolutional layer 412c that precedes the multi-layer perceptron mixer layer 414, c represents a hidden dimension, and s represents the number of patches, where $s = H'W'/p^2$. Further, LN represents Layer Normalization and $\sigma$ represents an activation function.

In one or more embodiments, the multi-layer perceptron mixer layer 414 includes a pair of fully connected layers and a Gaussian error linear units (GELU) layer positioned in between the pair of fully connected layers. For example, in one or more embodiments, the multi-layer perceptron mixer layer 414 includes the mixer multi-layer perceptron (MLP) component described by Ilya Tolstikhin et al., *MLP-mixer: An All-MLP Architecture for Vision*, arXiv preprint arXiv: 2105.01601, 2021, which is incorporated herein by reference in its entirety. It should be noted that the mixer component described by Ilya Tolstikhin et al. is designed to replace convolutional layers. In contrast, as shown in FIG.

4, the joint-based segmentation system 106 utilizes the multi-layer perceptron mixer layer 414 in combination with convolutional layers to address the small receptive field issue of the shallow local segmentation neural network 400.

As further shown by FIG. 4, the decoder 410 includes several neural network blocks 416a-416c. Each of the neural network blocks 416a-416c includes at least one residual block. As illustrated by the residual block 418 of FIG. 4, each residual block includes a pair of convolutional layers 420a-420b and a skip link 422 that directly passes input features to the output of the residual block.

As further shown in FIG. 4, the local segmentation neural network 400 includes skip links 424a-424b. Accordingly, the local segmentation neural network 400 provides intermediate feature values from the encoder 408 directly to the decoder 410. For example, the local segmentation neural network 400 provides intermediate feature values generated using the multi-layer perceptron mixer layer 414 directly to the decoder 410 via the skip link 424b.

By incorporating the multi-layer perceptron mixer layer 414 into the local segmentation neural network 400, the joint-based segmentation system 106 operates more efficiently than conventional systems. Indeed, the multi-layer perceptron mixer layer 414 is light weight but still effectively encodes the pose information with its global receptive field. Accordingly, the joint-based segmentation system 106 utilizes the local segmentation neural network 400 to generate accurate segmentation masks while consuming relatively lower amounts of computational resources when considered against comparative conventional systems.

In one or more embodiments, the joint-based segmentation system 106 trains the local segmentation neural network and the pose tracking neural network together. In some instances, however, the joint-based segmentation system 106 trains the neural networks separately. In some cases, the joint-based segmentation system 106 trains the neural networks (whether together or separately) by using training digital videos (or training frames) and ground truths (e.g., joint coordinates, bounding boxes, and/or joint-based segmentation masks that correspond to digital objects portrayed in the training digital videos).

In some embodiments, the joint-based segmentation system 106 stabilizes training of the local segmentation neural network by alternately assigning the sub-regions with ground truth boxes B* and predicted bounding boxes B̂. For example, in some cases, the joint-based segmentation system 106 decides the assignment by intersecting areas between B* and B̂. Given M ground truths and N box predictions, the joint-based segmentation system 106 determines the matching score $\mathcal{O} \in [0,1]^{M \times N}$ as follows:

$$O(m, n) = \frac{\text{Area}\left(B^*_m \cap \hat{B}_n\right)}{\text{Area}\left(B^*_m\right)} \quad (4)$$

In equation 4, Area denotes the area of a given box and $\cap$ results in an intersecting box based on the given pair.

In one or more embodiments, the joint-based segmentation system 106 further pairs up each predicted box with a ground truth box as $\hat{\sigma}(n) = \arg \max_m \mathcal{O}(m, n)$. In some cases, the joint-based segmentation system 106 finalizes the assignments of the sub-regions r as follows:

$$r_i = \begin{cases} \hat{B}_i & \text{if } O(\hat{\sigma}(i), i) \geq \tau \\ B^*_{\hat{\sigma}(i)} & \text{if } O(\hat{\sigma}(i), i) \leq \tau \end{cases} \quad (5)$$

Based on equation 5, the assignments of sub-regions r alternates between a predicted box and a ground truth box by a threshold of $\tau$. If the intersecting area of a predicted box is above $\tau$, the predicted box is assigned as it covers the majority of the corresponding ground truth box. On the other hand, if the intersecting area is below $\tau$, it is likely that the predicted box cannot sufficiently cover the mask within the ground truth box. Thus, the joint-based segmentation system 106 utilizes the ground truth box. In one or more embodiments, the joint-based segmentation system 106 assigns sets of joint coordinates in the same manner.

In one or more embodiments, the joint-based segmentation system 106 updates weights of the pose tracking neural network and/or the segmentation neural network using a loss determined from the predictions of the respective network. For instance, in some embodiments, the joint-based segmentation system 106 determines a loss for the segmentation neural network binary cross entropy loss $\mathcal{L}_{bce}$ and a dice loss $\mathcal{L}_{dice}$ as follows:

$$\mathcal{L} = \mathcal{L}_{bce} + \mathcal{L}_{dice} \qquad (6)$$

In some implementations, the joint-based segmentation system 106 updates the weights of the pose tracking neural network and/or the segmentation neural network over multiple training iterations to gradually improve the resulting performance.

As mentioned above, in one or more embodiments, the joint-based segmentation system 106 performs segmentation more accurately for digital objects portrayed in digital videos when compared to many conventional systems. Researchers have conducted studies to determine the accuracy of various embodiments of the joint-based segmentation system 106.

Figures 5A, 5B:
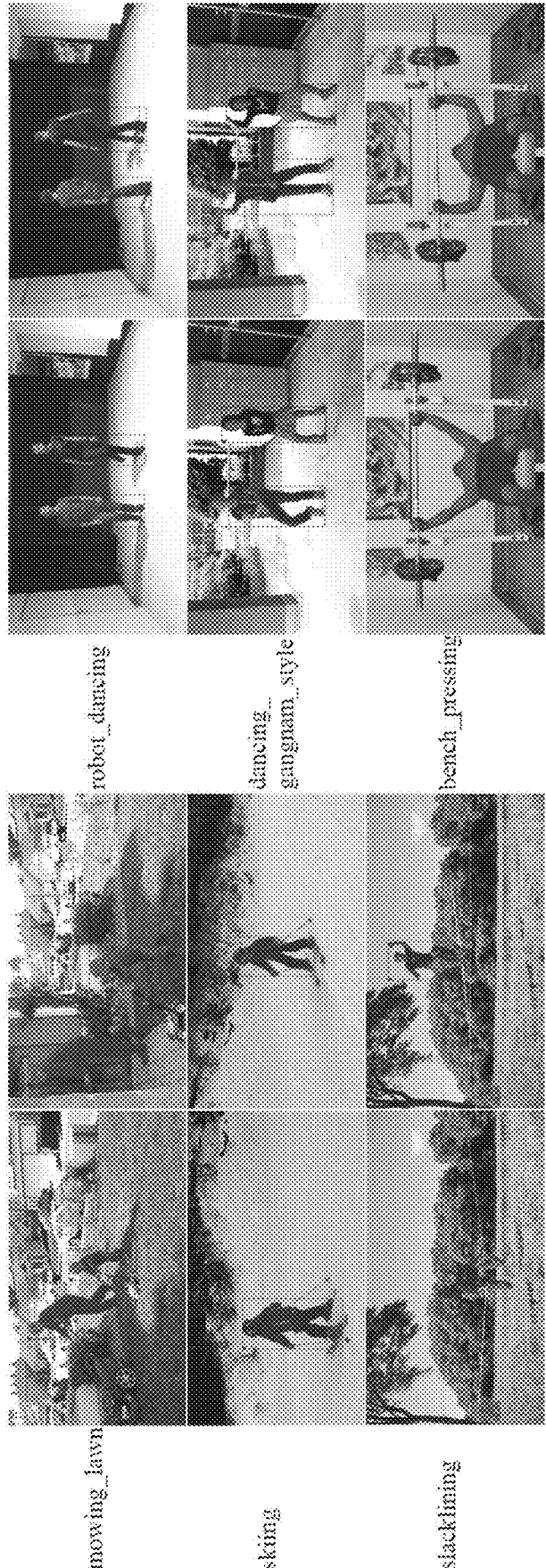
FIGS. 5A-5B graphical representations reflecting tools used in determining the effectiveness of the joint-based segmentation system in accordance with one or more embodiments.

To conduct the studies, the researchers created a dataset for video instance segmentation (VIS) evaluation. The dataset includes YouTube video filmed using a variety of camera devices. The videos are collected from the Kinetics dataset described in Will Kay et al., *The Kinetics Human Action Video Dataset*, arXiv preprint arXiv:1705.06950, 2017. The average video length of the dataset is six seconds, and the researchers annotated the masks at 6 frames per second (fps). FIGS. 5A-5B illustrate the data included in the dataset. In particular, FIG. 5A illustrates example frames from videos included in the dataset. FIG. 5B illustrates a table showing a breakdown of the data represented within the dataset.

In the studies, the researchers compared the performance of the joint-based segmentation system 106 against two online VIS models. In particular, the researchers compared the performance to that of the MaskTrack R-CNN described by Linjie Yang et al., *Video Instance Segmentation*, in ICCV, 2019. The researchers further compared the performance to that of the SipMask model described by Jiale Cao et al., *Sipmaks: Spatial Information Preservation for Fast Image and Video Instance Segmentation*, in ECCV, 2020.

Figure 6A:
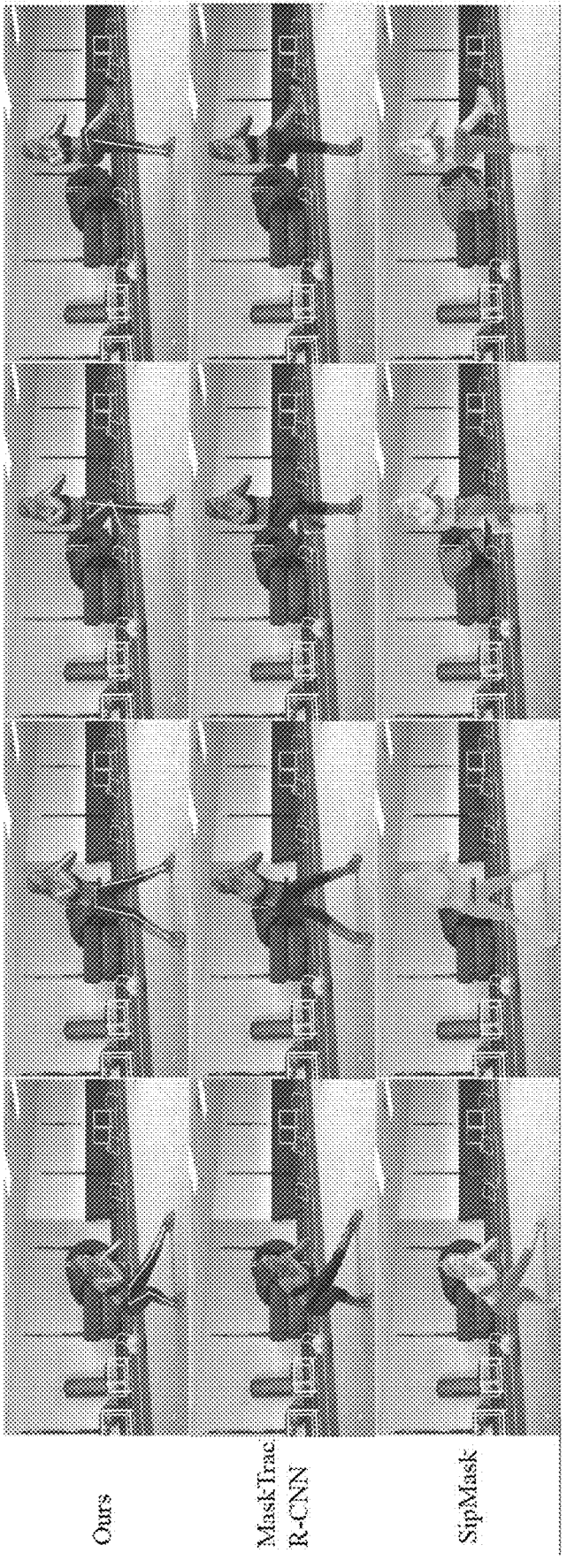
FIGS. 6A-6B illustrate graphical representations reflecting experimental results regarding the effectiveness of the joint-based segmentation system in accordance with one or more embodiments.
Figure 6B:
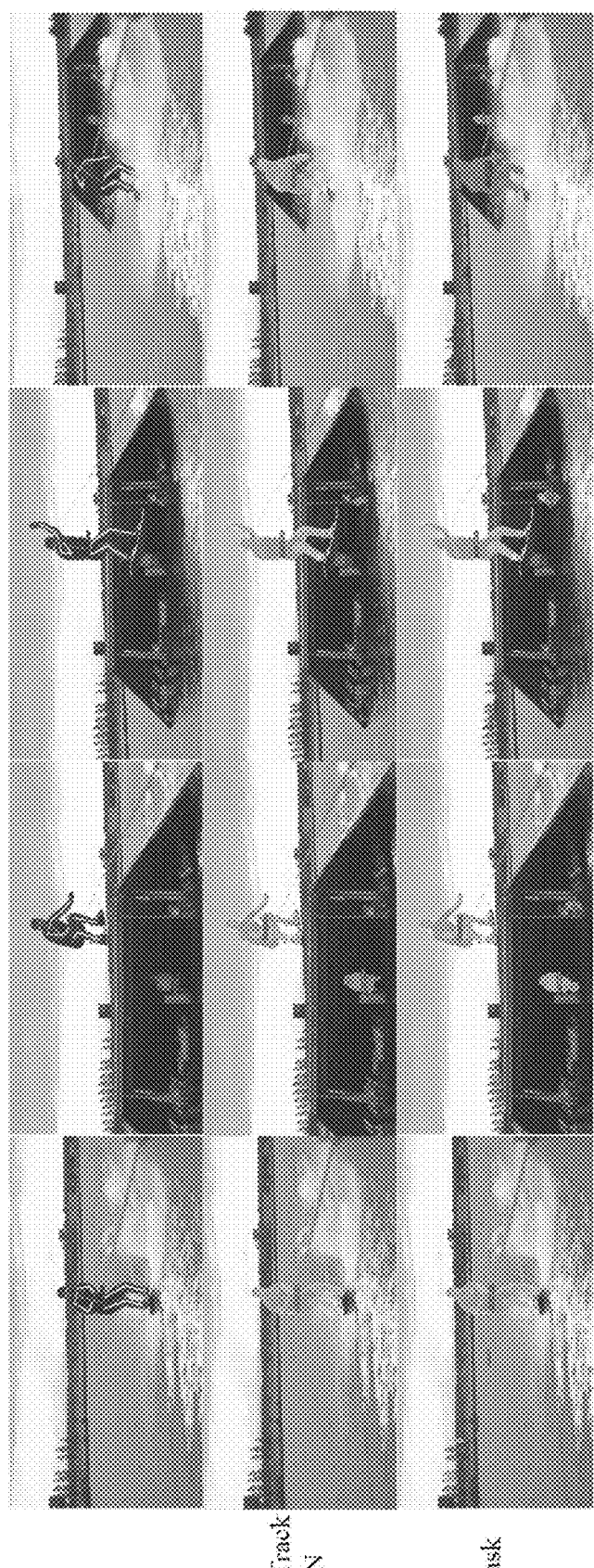

FIGS. 6A-6B illustrate graphical representations reflecting experimental results regarding the effectiveness of the joint-based segmentation system 106 in accordance with one or more embodiments. In particular, the graphical representations of FIGS. 6A-6B compare the segmentation of people performed by the joint-based segmentation system 106 to the segmentation performed by the other tested models. As can be seen in FIGS. 6A-6B, the MaskTrack R-CNN model provides poor boundary accuracy, and the SipMask model provides false positives (indicated by the extra labels provided in the video frames). By comparison, the joint-based segmentation system 106 provides improved boundary accuracy and does not provide false positives. Thus, the joint-based segmentation system 106 appears to perform more accurate segmentation of the people portrayed in the digital videos.

FIG. 7 illustrates a table reflecting additional experimental results with regard to the effectiveness of the joint-based segmentation system 106 in accordance with one or more embodiments. As shown by the table of FIG. 7, the researchers compared the performance of the tested models trained on various datasets. In particular, the researchers used the COCO dataset described by Tsung-Yi Lin et al., *Microsoft Coco: Common Objects in Context*, in ECCV, 2014. The researchers further used the YouTube-VIS (YTVIS) dataset described by Linjie Yang et al., *Video Instance Segmentation*, in ICCV, 2019.

As further shown by the table of FIG. 7, the researchers evaluated the performance of the tested models using the temporal mask intersection over union (TMIoU) metric, which is based on the average precision (AP) and the average recall (AR). Given two mask sequences G and P, TMIOU is determined at time t as follows:

$$TBIoU(G, P) = \frac{\sum_{t=1}^{T} |G_t \cap P_t|}{\sum_{t=1}^{T} |G_t \cup P_t|} \qquad (7)$$

To evaluate both spatial temporal consistency and mask quality of boundary region of predicted and ground truth masks, the researchers further evaluated the performance using a temporal boundary intersection over union (TBIoU) metric. The researchers defined the TBIoU metric as follows:

$$TBIoU(G, P) = \frac{\sum_{t=1}^{T} |(G_t^d \cap G_t) \cap (P_d^t \cap P_t)|}{\sum_{t=1}^{T} |(G_t^d \cap G_t) \cup (P_d^t \cap P_t)|} \qquad (8)$$

In equation 8, $$G_t^d$$

and $$P_d^t$$

represent the sets of all pixels within d pixels distance at time t from the ground truth and prediction contours, respectively. The dilation is computed by dilation ratio×image diagonal. In the studies, the researchers used 0.01 as the ratio to calculate dilation.

As shown by the table of FIG. 7, for the temporal mask AP (TMIoU measure), the joint-based segmentation system 106 outperforms the other tested models with an 84.2 AP. Further, for the temporal boundary AP (TBIoU measure) outperforms both of the other tested models. The result of the TBIoU measure indicates that the joint-based segmentation system 106 provides superior boundary accuracy compared to the other models.

As further shown by the table of FIG. 7, the joint-based segmentation system 106 runs at 33 fps, which is competitive considering it predicts both masks and key points (e.g., joints). Accordingly, these results indicate that the joint-based segmentation system 106 achieves a strong balance between quality and speed.

FIG. 8 illustrates a table reflecting further experimental results with regard to the effectiveness of the joint-based segmentation system 106 in accordance with one or more embodiments. In particular, the able of FIG. 8 reflects the results of an ablation study performed by the researchers to determine how different settings affect overall performance.

As indicated by the table of FIG. 8, the researchers tested the effectiveness of providing key point information represented as a heat map to the local segmentation neural network. By providing more detailed localized information than the bounding box, the key point guidance offers a significant performance improvement. Further, the researchers tested the effectiveness of the multi-layer perceptron mixer layer. Then results shown by the table indicate that the multi-layer perceptron mixer layer improves the boundary details by aggregating sparse body joint information.

Figure 9:
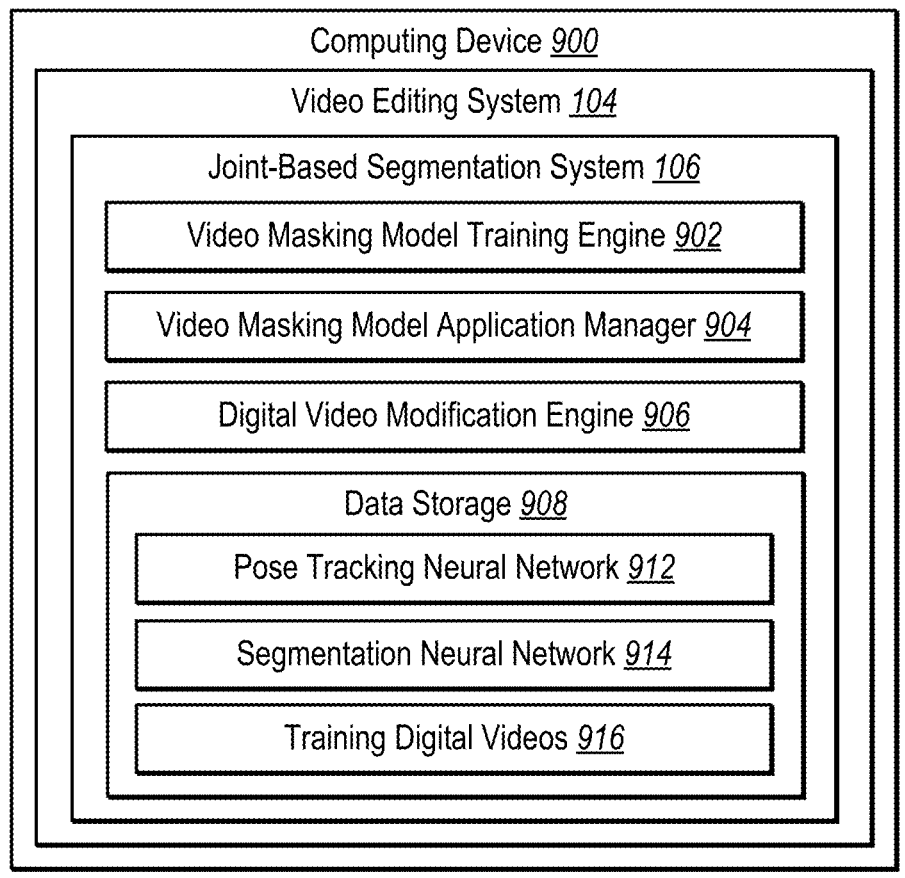
FIG. 9 illustrates an example schematic diagram of a joint-based segmentation system in accordance with one or more embodiments.

Turning to FIG. 9, additional detail will now be provided regarding various components and capabilities of the joint-based segmentation system 106. In particular, FIG. 9 shows the joint-based segmentation system 106 implemented by the computing device 900 (e.g., the server(s) 102 and/or one of the client devices 110a-110n discussed above with reference to FIG. 1). Additionally, the joint-based segmentation system 106 is also part of the video editing system 104. As shown, in one or more embodiments, the joint-based segmentation system 106 includes, but is not limited to, a video masking model training engine 902, a video masking model application manager 904, a digital video modification engine 906, and data storage 908 (which includes a pose tracking neural network 912, a segmentation neural network 914, and training digital videos 916).

As just mentioned, and as illustrated in FIG. 9, the joint-based segmentation system 106 includes the video masking model training engine 902. In one or more embodiments, the video masking model training engine 902 trains a video masking model to generate joint-based segmentation masks for digital objects portrayed in digital videos. For example, in some embodiments, the video masking model training engine 902 trains a pose tracking neural network to determine sets of joint coordinates, tracking identifiers, and bounding boxes corresponding to digital objects portrayed within frames of a digital video. Further, the video masking model training engine 902 trains a segmentation neural network to generate joint-based segmentation masks using the joint coordinates, the tracking identifiers, and the bounding boxes.

Additionally, as shown in FIG. 9, the joint-based segmentation system 106 includes the video masking model application manager 904. In one or more embodiments, the video masking model application manager 904 implements the video masking model trained by the video masking model training engine 902 to generate joint-based segmentation masks for digital object portrayed in digital videos. For example, in some cases, the video masking model application manager 904 utilizes the video masking model to analyze frames of a digital video and generate at least one joint-based segmentation mask for each frame that portrays an instance of a digital object.

As shown in FIG. 9, the joint-based segmentation system 106 further includes the digital video modification engine 906. In one or more embodiments, the joint-based segmentation system 106 modifies a digital video using joint-based segmentation masks generated for the digital video. For example, in some implementations, the joint-based segmentation system 106 modifies one or more frames of the video using at least one corresponding joint-based segmentation mask. In some implementations, the joint-based segmentation system 106 modifies the digital video by adding text, color, a background change and/or various other visual effects to the digital video.

Further, as shown, the joint-based segmentation system 106 includes data storage 908. In particular, data storage 908 includes the pose tracking neural network 912, a segmentation neural network 914, and digital videos 916.

Each of the components 902-916 of the joint-based segmentation system 106 can include software, hardware, or both. For example, the components 902-916 can include one or more instructions stored on a computer-readable storage medium and executable by processors of one or more computing devices, such as a client device or server device. When executed by the one or more processors, the computer-executable instructions of the joint-based segmentation system 106 can cause the computing device(s) to perform the methods described herein. Alternatively, the components 902-916 can include hardware, such as a special-purpose processing device to perform a certain function or group of functions. Alternatively, the components 902-916 of the joint-based segmentation system 106 can include a combination of computer-executable instructions and hardware.

Furthermore, the components 902-916 of the joint-based segmentation system 106 may, for example, be implemented as one or more operating systems, as one or more standalone applications, as one or more modules of an application, as one or more plug-ins, as one or more library functions or functions that may be called by other applications, and/or as a cloud-computing model. Thus, the components 902-916 of the joint-based segmentation system 106 may be implemented as a stand-alone application, such as a desktop or mobile application. Furthermore, the components 902-916 of the joint-based segmentation system 106 may be implemented as one or more web-based applications hosted on a remote server. Alternatively, or additionally, the components 902-916 of the joint-based segmentation system 106 may be implemented in a suite of mobile device applications or "apps." For example, in one or more embodiments, the joint-based segmentation system 106 can comprise or operate in connection with digital software applications such as ADOBE® AFTER EFFECTS®, ADOBE® PREMIERE®, or ADOBE® PREMIERE®. "ADOBE," "AFTER EFFECTS," and "PREMIERE" are either registered trademarks or trademarks of Adobe Inc. in the United States and/or other countries.

Figure 10:
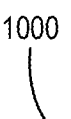
FIG. 10 illustrates a flowchart of a series of acts for generating a joint-based segmentation mask for a digital object portrayed in a digital video in accordance with one or more embodiments.
Figure 10:
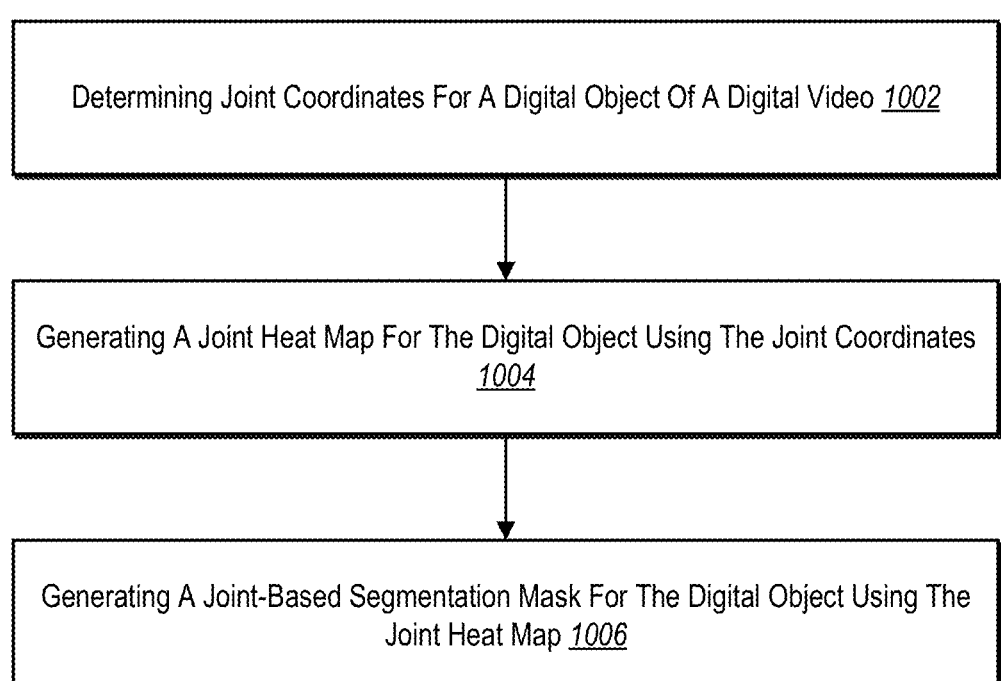

FIGS. 1-9, the corresponding text, and the examples provide a number of different methods, systems, devices, and non-transitory computer-readable media of the joint-based segmentation system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for generating a joint-based segmentation mask for a digital object portrayed in a digital video in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed, in a digital medium environment for editing digital videos, as part of a computer-implemented method for generating segmentation masks from identified object joints. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device comprising a video masking model comprising a pose tracking neural network and a segmentation neural network. The system further includes at least one server device configured to cause the system to perform the acts of FIG. 10.

The series of acts 1000 includes an act 1002 of determining joint coordinates for a digital object of a digital video. For instance, in one or more embodiments, the act 1002 involves determining a set of joint coordinates corresponding to a digital object portrayed in a frame of a digital video. In one or more embodiments, determining the set of joint coordinates corresponding to the digital object portrayed in the frame of the digital video comprises determining, utilizing a global pose tracking neural network, the set of joint coordinates based on the frame of the digital video.

In one or more embodiments, the joint-based segmentation system 106 extracts, from the digital video, the frame of the digital video and a preceding frame of the digital video. Accordingly, in some cases, determining the set of joint coordinates corresponding to the digital object portrayed in the frame of the digital video comprises determining the set of joint coordinates using the frame of the digital video and the preceding frame of the digital video.

The series of acts 1000 also includes an act 1004 of generating a joint heat map for the digital object using the joint coordinates. For example, in one or more embodiments, the act 1004 involves generating, using the set of joint coordinates, a joint heat map corresponding to the digital object portrayed in the frame of the digital video. In one or more embodiments, generating the joint heat map using the set of joint coordinates comprises centering a Gaussian distribution at each joint point associated with the set of joint coordinates.

Further, the series of acts 1000 includes an act 1006 of generating a joint-based segmentation mask for the digital object using the joint heat map. To illustrate, in some cases, the act 1006 involves generating a joint-based segmentation mask corresponding to the digital object portrayed in the frame of the digital video using the joint heat map.

In one or more embodiments, generating the joint-based segmentation mask corresponding to the digital object portrayed in the frame of the digital video using the joint heat map comprises generating, utilizing a local segmentation neural network, the joint-based segmentation mask based on the joint heat map and the frame. In some cases, generating, utilizing the local segmentation neural network, the joint-based segmentation mask based on the joint heat map and the frame comprises: generating, utilizing a multi-layer perceptron mixer layer of the local segmentation neural network, mixer encodings for the digital object based on the joint heat map; and generating the joint-based segmentation mask based on the mixer encodings.

In some embodiments, the joint-based segmentation system 106 further determines a bounding box associated with the digital object for the frame of the digital video based on the set of joint coordinates; and generates, from the frame of the digital video, a cropped frame that includes the digital object using the bounding box. Accordingly, in one or more embodiments, generating the joint-based segmentation mask using the joint heat map and the frame comprises generating the joint-based segmentation mask, utilizing a local segmentation neural network, based on the joint heat map and the cropped frame.

In one or more embodiments, the series of acts 1000 further includes acts for using the joint-based segmentation mask. For example, in some instances, the acts include modifying the frame of the digital video utilizing the joint-based segmentation mask.

To provide an illustration, in one or more embodiments, the joint-based segmentation system 106 determines, utilizing a pose tracking neural network, a set of joint coordinates corresponding to a digital object portrayed in a frame of a digital video; generates, utilizing a segmentation neural network, a joint-based segmentation mask corresponding to the digital object portrayed in the frame of the digital video based on the set of joint coordinates; and modifies the digital video utilizing the joint-based segmentation mask.

In some cases, the joint-based segmentation system 106 determines, utilizing the pose tracking neural network, the set of joint coordinates by determining the set of joint coordinates by globally analyzing the frame of the digital video using the pose tracking neural network; and generates, utilizing the segmentation neural network, the joint-based segmentation mask based on the set of joint coordinates by generating the joint-based segmentation mask by locally analyzing a portion of the frame of the digital video that contains the digital object based on the set of joint coordinates utilizing the segmentation neural network. In some implementations, the joint-based segmentation system 106 further generates, from the frame of the digital video, a cropped frame that includes the digital object based on the set of joint coordinates. Accordingly, in some cases, generating the joint-based segmentation mask by locally analyzing the portion of the frame of the digital video that contains the digital object based on the set of joint coordinates utilizing the segmentation neural network comprises generating the joint-based segmentation mask based on the cropped frame and the set of joint coordinates utilizing the segmentation neural network.

In some embodiments, the joint-based segmentation system 106 further determines, utilizing the pose tracking neural network, a bounding box associated with the digital object and a tracking identifier that distinguishes the digital object from other digital objects portrayed in the frame of the digital video.

In some instances, the joint-based segmentation system 106 determines, utilizing the pose tracking neural network, the set of joint coordinates corresponding to the digital object portrayed in the frame of the digital video by determining, utilizing the pose tracking neural network, the set of joint coordinates associated with a set of pre-determined human joints corresponding to a person portrayed in the frame of the digital video. In some embodiments, the joint-based segmentation system 106 generates, utilizing the segmentation neural network, the joint-based segmentation mask corresponding to the digital object portrayed in the frame of the digital video based on the set of joint coordinates by mixing, utilizing a multi-layer perceptron mixer layer of the segmentation neural network, visual features associated with the digital object based on the set of joint coordinates to generate the joint-based segmentation mask.

In one or more embodiments, the joint-based segmentation system 106 further determines, utilizing the pose tracking neural network, an additional set of joint coordinates corresponding to an additional digital object portrayed in the frame of the digital video; and generates, utilizing the segmentation neural network, an additional joint-based segmentation mask corresponding to the additional digital object based on the additional set of joint coordinates.

In some cases, the joint-based segmentation system 106 further determines intermediate feature values associated with the digital object portrayed in the frame of the digital video utilizing the pose tracking neural network; and provides the intermediate feature values from the pose tracking neural network to the segmentation neural network for generating the joint-based segmentation mask via a skip link.

To provide another illustration, in one or more embodiments, the joint-based segmentation system 106 determines, utilizing the pose tracking neural network, a set of joint coordinates corresponding to a digital object portrayed in a frame of a digital video; generates, using the set of joint coordinates, a joint heat map corresponding to the digital object portrayed in the frame of the digital video; determines, utilizing an encoder of the segmentation neural network, mixer encodings for the digital object based on the joint heat map, the encoder comprising a plurality of convolutional layers and a multi-layer perceptron mixer layer; and generates, utilizing a decoder of the segmentation neural network, a joint-based segmentation mask for the digital object portrayed in the frame of the digital video based on the mixer encodings.

In some cases, the joint-based segmentation system 106 determines, utilizing the pose tracking neural network, the set of joint coordinates corresponding to the digital object portrayed in the frame of a digital video by determining, utilizing the pose tracking neural network, the set of joint coordinates based on the frame of the digital video and a preceding frame of the digital video that portrays the digital object.

In some implementations, the joint-based segmentation system 106 further determines intermediate feature values associated with the digital object utilizing the multi-layer perceptron mixer layer of the encoder; and provides the intermediate feature values from the encoder of the segmentation neural network to the decoder of the segmentation neural network for generating the joint-based segmentation mask via a skip link. In some instances, the joint-based segmentation system 106 generates, utilizing the video masking model, a plurality of additional joint-based segmentation masks corresponding to the digital object portrayed in a plurality of additional frames of the digital video; and modifies the digital video utilizing the joint-based segmentation mask and the plurality of additional joint-based segmentation masks.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
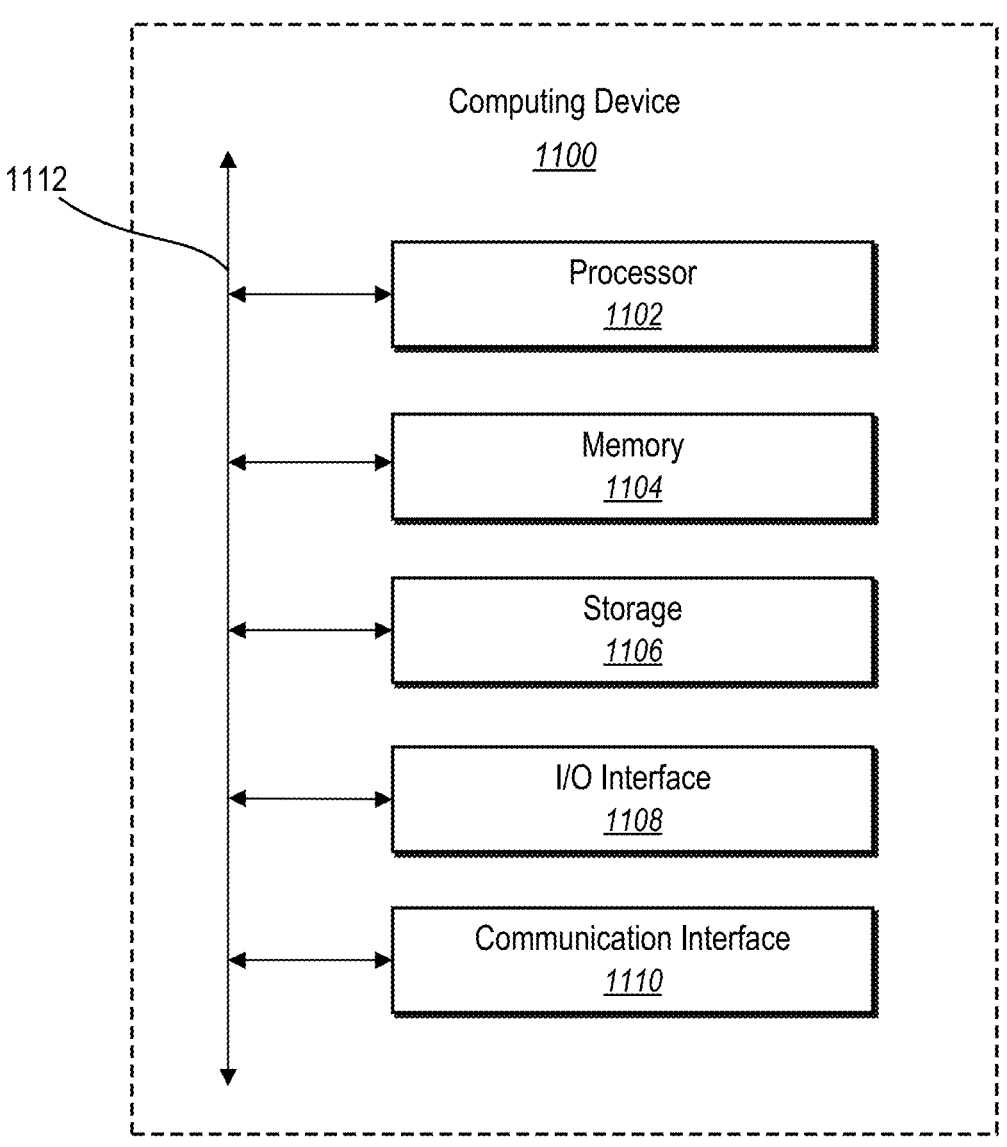
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While computing device 1100 is shown in FIG. 11, the components illustrated in FIG. 11 are not intended to be limiting.

Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

generating a down-sampled frame corresponding to a frame of a digital video;

determining, using a global pose tracking neural network and from the down-sampled frame, a set of joint coordinates corresponding to a digital object portrayed in the frame of the digital video;

generating, using the set of joint coordinates, a joint heat map corresponding to the digital object portrayed in the frame of the digital video, the joint heat map having values that distinguish between joint points corresponding to the set of joint coordinates and areas of the frame of the digital video that surround the joint points;

determining, using one or more convolutional layers of a local segmentation neural network, visual features from the joint heat map and the frame of the digital video;

generating, using at least one multi-perceptron mixer layer of the local segmentation neural network, mixer encodings that mix the visual features across feature channels by generating the mixer encodings from the visual features using layer normalization and an activation function of the at least one multi-perceptron mixer layer; and generating, using the local segmentation neural network and from the mixer encodings, a joint-based segmentation mask that corresponds to the digital object portrayed in the frame.

2. The method of claim 1, wherein determining, using the global pose tracking neural network and the down-sampled frame, the set of joint coordinates corresponding to the digital object portrayed in the frame of the digital video comprises determining the set of joint coordinates by using the global pose tracking neural network to globally analyze the down-sampled frame and an additional down-sampled frame corresponding to a preceding frame of the digital video.

3. The method of claim 1, wherein generating the joint-based segmentation mask that corresponds to the digital object comprises generating the joint-based segmentation mask from a bounding box associated with the digital object for the frame of the digital video.

4. The method of claim 1, wherein generating, using the local segmentation neural network and from the mixer encodings, the joint-based segmentation mask comprises generating, using one or more additional convolutional layers of the local segmentation neural network and from the mixer encodings, the joint-based segmentation mask.

5. The method of claim 3, further comprising:

determining the bounding box associated with the digital object for the frame of the digital video based on the set of joint coordinates; and generating, from the frame of the digital video, a cropped frame that includes the digital object using the bounding box, wherein generating the joint-based segmentation mask from the bounding box associated with the digital object comprises generating the joint-based segmentation mask from the cropped frame.

6. The method of claim 1, further comprising extracting, from the digital video, the frame of the digital video and a preceding frame of the digital video, wherein determining the set of joint coordinates corresponding to the digital object portrayed in the frame of the digital video comprises determining the set of joint coordinates using the frame of the digital video and the preceding frame of the digital video.

7. The method of claim 1, wherein generating the joint heat map using the set of joint coordinates comprises centering a Gaussian distribution at each joint point associated with the set of joint coordinates.

8. The method of claim 1, further comprising modifying the frame of the digital video utilizing the joint-based segmentation mask.

9. A non-transitory computer-readable medium storing instructions thereon that, when executed by at least one processor, cause the at least one processor to perform operations comprising:

generating a down-sampled frame corresponding to a frame of a digital video;

determining, using a global pose tracking neural network and from the down-sampled frame, a set of joint coordinates corresponding to a digital object portrayed in the frame of the digital video;

generating, using the set of joint coordinates, a joint heat map corresponding to the digital object portrayed in the frame of the digital video, the joint heat map having values that distinguish between joint points corresponding to the set of joint coordinates and areas of the frame of the digital video that surround the joint points;

determining, using one or more convolutional layers of a local segmentation neural network, visual features from the joint heat map and the frame of the digital video;

generating, using at least one multi-perceptron mixer layer of the local segmentation neural network, mixer encodings that mix the visual features across feature channels by generating the mixer encodings from the visual features using layer normalization and an activation function of the at least one multi-perceptron mixer layer; and generating, using the local segmentation neural network and from the mixer encodings, a joint-based segmentation mask that corresponds to the digital object portrayed in the frame.

10. The non-transitory computer-readable medium of claim 9, wherein:

determining, utilizing the global pose tracking neural network and the down-sampled frame, the set of joint coordinates comprises determining the set of joint coordinates by globally analyzing the down-sampled frame using the global pose tracking neural network; and determining the visual features from the joint heat map and the frame of the digital video using the one or more convolutional layers of the local segmentation neural network comprises determining the visual features by locally analyzing a portion of the frame of the digital video that contains the digital object based on the joint heat map using the one or more convolutional layers of the local segmentation neural network.

11. The non-transitory computer-readable medium of claim 10, wherein:

the operations further comprise generating, from the frame of the digital video, a cropped frame that includes the digital object based on the set of joint coordinates; and determining the visual features by locally analyzing the portion of the frame of the digital video that contains the digital object based on the joint heat map utilizing the one or more convolutional layers of the local segmentation neural network comprises determining the visual features based on the cropped frame and the joint heat map utilizing the one or more convolutional layers of the local segmentation neural network.

12. The non-transitory computer-readable medium of claim 9, wherein the operations further comprise determining, utilizing the global pose tracking neural network, a bounding box associated with the digital object and a tracking identifier that distinguishes the digital object from other digital objects portrayed in the frame of the digital video.

13. The non-transitory computer-readable medium of claim 9, wherein determining, utilizing the global pose tracking neural network, the set of joint coordinates corresponding to the digital object portrayed in the frame of the digital video comprises determining, utilizing the global pose tracking neural network, the set of joint coordinates associated with a set of pre-determined human joints corresponding to a person portrayed in the frame of the digital video.

14. The non-transitory computer-readable medium of claim 9, wherein generating, using the local segmentation neural network and from the mixer encodings, the joint-based segmentation mask comprises generating, using one or more additional convolutional layers of the local segmentation neural network and from the mixer encodings, the joint-based segmentation mask.

15. The non-transitory computer-readable medium of claim 10, wherein the operations further comprise:

determining, utilizing the global pose tracking neural network, an additional set of joint coordinates corresponding to an additional digital object portrayed in the frame of the digital video; and generating, utilizing the local segmentation neural network, an additional joint-based segmentation mask corresponding to the additional digital object based on the additional set of joint coordinates.

16. The non-transitory computer-readable medium of claim 10, wherein the operations further comprise:

determining intermediate feature values associated with the digital object portrayed in the frame of the digital video utilizing the global pose tracking neural network; and providing the intermediate feature values from the global pose tracking neural network to the local segmentation neural network for generating the joint-based segmentation mask via a skip link.

17. A system comprising:

at least one memory device; and at least one server device configured to cause the system to:

generate a down-sampled frame corresponding to a frame of a digital video;

determine, utilizing a global pose tracking neural network and from the down-sampled frame, a set of joint coordinates corresponding to a digital object portrayed in the frame of the digital video;

generate, using the set of joint coordinates, a joint heat map corresponding to the digital object portrayed in the frame of the digital video, the joint heat map having values that distinguish between joint points corresponding to the set of joint coordinates and areas of the frame of the digital video that surround the joint points;

determine, utilizing an encoder of a segmentation neural network, mixer encodings for the digital object based on the joint heat map, the encoder comprising:

a plurality of convolutional layers that determine a set of features using the joint heat map; and a multi-layer perceptron mixer layer that determines the mixer encodings by mixing the set of features using layer normalization and an activation function; and generate, utilizing a decoder of the segmentation neural network, a joint-based segmentation mask for the digital object portrayed in the frame of the digital video based on the mixer encodings.

18. The system of claim 17, wherein the at least one server device is configured to cause the system to determine, utilizing the global pose tracking neural network, the set of joint coordinates corresponding to the digital object portrayed in the frame of the digital video by determining, utilizing the global pose tracking neural network, the set of joint coordinates based on the down-sampled frame and an additional down-sampled frame that corresponds to a preceding frame of the digital video that portrays the digital object.

19. The system of claim 17, wherein the at least one server device is further configured to cause the system to:

determine intermediate feature values associated with the digital object utilizing the multi-layer perceptron mixer layer of the encoder; and provide the intermediate feature values from the encoder of the segmentation neural network to the decoder of the segmentation neural network for generating the joint-based segmentation mask via a skip link.

20. The system of claim 17, wherein the at least one server device is configured to cause the system to generate, utilizing the decoder of the segmentation neural network, the joint-based segmentation mask based on the mixer encodings by:

generating, using one or more convolutional layers of the decoder and from the mixer encodings, the joint-based segmentation mask.

* * * * *